(12) United States Patent
Elliott et al.

(10) Patent No.: US 7,918,492 B2
(45) Date of Patent: Apr. 5, 2011

(54) VEHICLE DOOR BELT AND CAM ARTICULATING MECHANISM

(75) Inventors: Adrian Nicholas Alexander Elliott, Dearborn, MI (US); Justin Thales Johnson, Idaho Falls, ID (US); Jason Falenski, Berkley, MI (US); Rajinder P. Singh, Plymouth, MI (US); Dave Michael Lechkun, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 12/348,566

(22) Filed: Jan. 5, 2009

(65) Prior Publication Data

US 2010/0171336 A1 Jul. 8, 2010

(51) Int. Cl.
*B60J 5/04* (2006.01)
(52) U.S. Cl. .................................. 296/146.12
(58) Field of Classification Search .......... 296/146.11, 296/146.12, 155
See application file for complete search history.

(56) References Cited

U.S. PATENT DOCUMENTS

| | | | |
|---|---|---|---|
| 2,904,852 A * | 9/1959 | Davis ............................ 49/127 |
| 3,051,999 A | 9/1962 | Schimek |
| 3,075,803 A | 1/1963 | Wilfert |
| 3,313,063 A | 4/1967 | Patin |
| 3,619,853 A | 11/1971 | Merrill |
| 3,628,216 A | 12/1971 | Savell |
| 3,728,819 A * | 4/1973 | Goldbach et al. ............... 49/216 |
| 3,758,990 A | 9/1973 | Balanos |
| 3,935,674 A | 2/1976 | Williams et al. |
| 4,025,104 A | 5/1977 | Grossbach et al. |
| 4,135,760 A | 1/1979 | Grossbach |
| 4,945,677 A | 8/1990 | Kramer |
| 5,139,307 A | 8/1992 | Koops et al. |
| 5,251,953 A | 10/1993 | Willey |
| 5,319,880 A * | 6/1994 | Kuhlman ........................ 49/360 |
| 5,398,988 A | 3/1995 | DeRees et al. |
| 5,507,119 A | 4/1996 | Sumiya et al. |
| 5,561,887 A | 10/1996 | Neag et al. |
| 5,812,684 A | 9/1998 | Mark |
| 5,846,463 A | 12/1998 | Keeney et al. |
| 5,896,704 A | 4/1999 | Neag et al. |
| 5,921,613 A | 7/1999 | Breunig et al. |
| 6,030,025 A | 2/2000 | Kanerva |

(Continued)

FOREIGN PATENT DOCUMENTS

DE 3831698 A1 3/1990

(Continued)

*Primary Examiner* — H Gutman
(74) *Attorney, Agent, or Firm* — Gregory P. Brown; Price, Heneveld, Cooper, DeWitt & Litton, LLP

(57) ABSTRACT

A vehicle door articulating mechanism including an articulating hinge assembly having a hinge arm pivotally mounted to a vehicle structure at one end thereof, a vehicle door pivotally mounted via first and second hinge mounts to the hinge arm at an opposite end of the hinge arm, a first cam mounted to the first hinge mount at one end of the hinge arm, a second cam mounted to the second hinge mount at an opposite end of the hinge arm, and a belt encircling both first and second cams. The hinge arm is disposed at first and second angular positions when the vehicle door is respectively disposed in closed and opened positions. The vehicle door articulating mechanism allows the door to articulate away independent of an adjacent vehicle door during initial and continued opening of vehicle door.

14 Claims, 35 Drawing Sheets

U.S. PATENT DOCUMENTS

| | | | |
|---|---|---|---|
| 6,036,257 A | 3/2000 | Manuel | |
| 6,183,039 B1 | 2/2001 | Kohut et al. | |
| 6,196,618 B1 | 3/2001 | Pietryga et al. | |
| 6,213,535 B1 | 4/2001 | Landmesser et al. | |
| 6,299,235 B1 | 10/2001 | Davis et al. | |
| 6,382,705 B1 | 5/2002 | Lang et al. | |
| 6,386,621 B1* | 5/2002 | Kozak et al. | 296/155 |
| 6,390,535 B1* | 5/2002 | Chapman | 296/155 |
| 6,394,529 B2 | 5/2002 | Davis et al. | |
| 6,447,054 B1 | 9/2002 | Pietryga et al. | |
| 6,572,176 B2 | 6/2003 | Davis et al. | |
| 6,629,337 B2 | 10/2003 | Nania | |
| 6,793,268 B1 | 9/2004 | Faubert et al. | |
| 6,802,154 B1 | 10/2004 | Holt et al. | |
| 6,817,651 B2 | 11/2004 | Carvalho et al. | |
| 6,826,869 B2 | 12/2004 | Oberheide | |
| 6,860,543 B2 | 3/2005 | George et al. | |
| 6,896,315 B2 | 5/2005 | Batinli et al. | |
| 6,926,342 B2 | 8/2005 | Pommeret et al. | |
| 6,942,277 B2 | 9/2005 | Rangnekar et al. | |
| 6,997,504 B1 | 2/2006 | Lang et al. | |
| 7,000,977 B2 | 2/2006 | Anders | |
| 7,003,915 B2 | 2/2006 | Yokomori | |
| 7,032,953 B2 | 4/2006 | Rangnekar et al. | |
| 7,104,588 B2 | 9/2006 | George et al. | |
| 7,168,753 B1 | 1/2007 | Faubert et al. | |
| 7,178,853 B2 | 2/2007 | Oxley et al. | |
| 7,219,948 B2 | 5/2007 | Curtis, Jr. et al. | |
| 7,243,978 B2 | 7/2007 | Mather et al. | |
| 7,287,804 B2* | 10/2007 | Yamagishi et al. | 296/155 |
| 7,325,361 B2* | 2/2008 | Rogers et al. | 49/360 |
| 7,341,304 B2* | 3/2008 | Osada et al. | 296/155 |
| 7,393,044 B2 | 7/2008 | Enomoto | |
| 7,445,005 B2* | 11/2008 | Bartmann et al. | 126/197 |
| 7,523,585 B2* | 4/2009 | Butera et al. | 49/72 |
| 7,611,190 B1 | 11/2009 | Elliott et al. | |
| 7,810,282 B2* | 10/2010 | Oxley | 49/362 |
| 2002/0096800 A1 | 7/2002 | Keeney et al. | |
| 2003/0218358 A1 | 11/2003 | Hahn | |
| 2005/0093337 A1 | 5/2005 | Herrmann et al. | |
| 2005/0116496 A1 | 6/2005 | Lowson et al. | |
| 2005/0134158 A1* | 6/2005 | Bartmann et al. | 312/319.2 |
| 2005/0146159 A1 | 7/2005 | Shen et al. | |
| 2006/0059799 A1 | 3/2006 | Zimmer et al. | |
| 2006/0103047 A1 | 5/2006 | Zwolinski | |
| 2006/0249983 A1 | 11/2006 | Heuel et al. | |
| 2006/0267375 A1 | 11/2006 | Enomoto | |
| 2007/0075565 A1 | 4/2007 | Magsaam | |
| 2007/0085374 A1 | 4/2007 | Mather et al. | |
| 2007/0214606 A1 | 9/2007 | Hoffman | |
| 2007/0283524 A1* | 12/2007 | Gordon | 16/78 |
| 2008/0190028 A1 | 8/2008 | Oxley | |
| 2008/0224501 A1 | 9/2008 | Zimmer et al. | |
| 2009/0000200 A1 | 1/2009 | Heuel et al. | |
| 2009/0051194 A1 | 2/2009 | Elliott et al. | |
| 2009/0070960 A1 | 3/2009 | Elliott et al. | |
| 2009/0072582 A1 | 3/2009 | Elliott et al. | |
| 2009/0072583 A1 | 3/2009 | Elliott et al. | |
| 2009/0200833 A1 | 8/2009 | Heuel et al. | |

FOREIGN PATENT DOCUMENTS

| | | |
|---|---|---|
| DE | 102004039885 A1 | 2/2006 |
| EP | 0012511 A1 | 6/1980 |
| EP | 0875434 A1 | 11/1998 |
| EP | 0957019 A2 | 11/1999 |
| EP | 1813759 A1 | 8/2007 |
| GB | 389061 | 5/1931 |
| JP | 3140583 A | 6/1991 |
| JP | 3140584 A | 6/1991 |
| JP | 2004175199 A | 6/2004 |
| JP | 2005153738 A | 6/2005 |
| JP | 2007138630 A | 6/2007 |
| JP | 2008094323 A | 4/2008 |
| KR | 100448753 B1 | 9/2004 |
| WO | 0242589 A1 | 5/2002 |
| WO | WO 200600572 A1 | 1/2006 |

\* cited by examiner

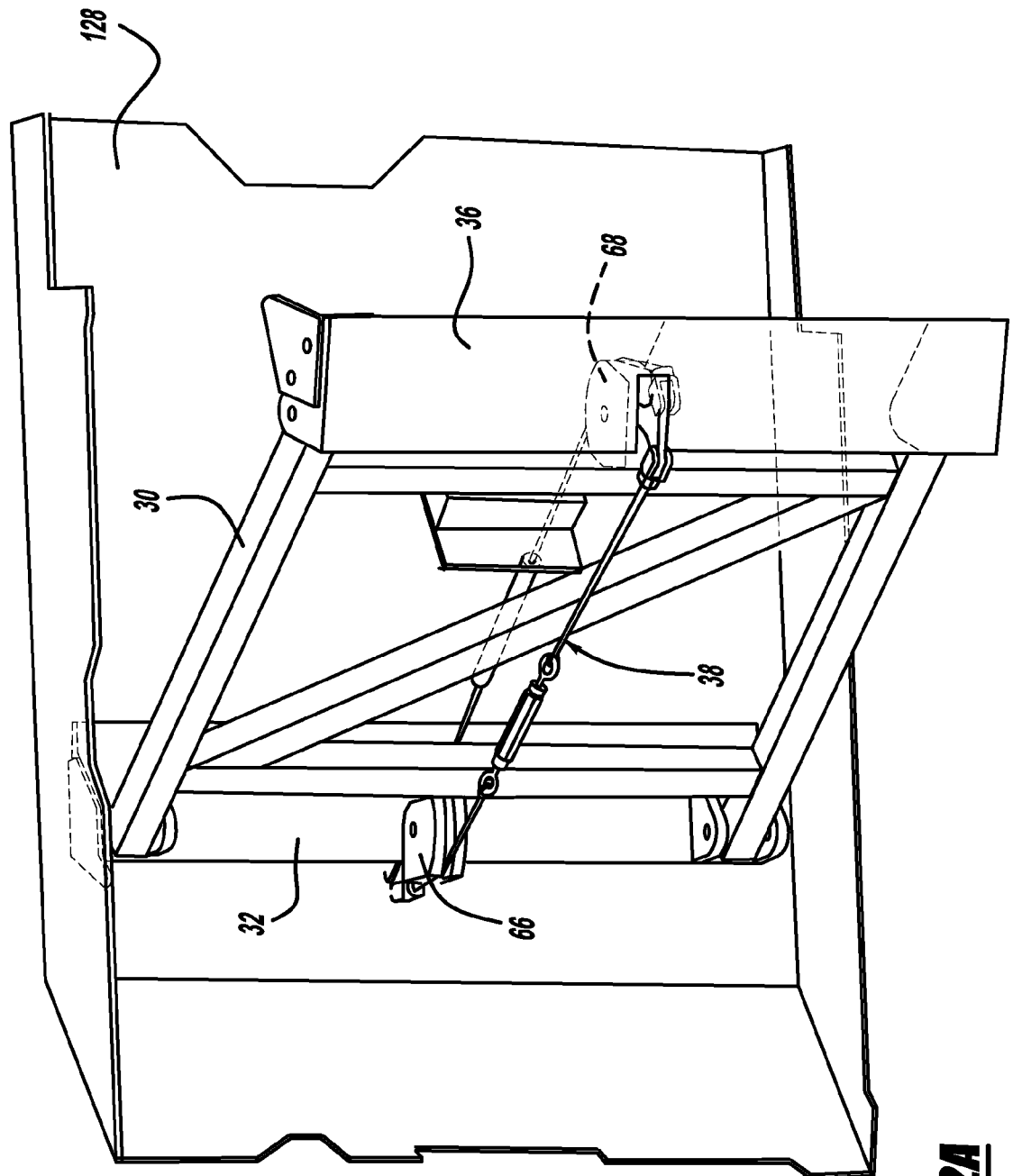

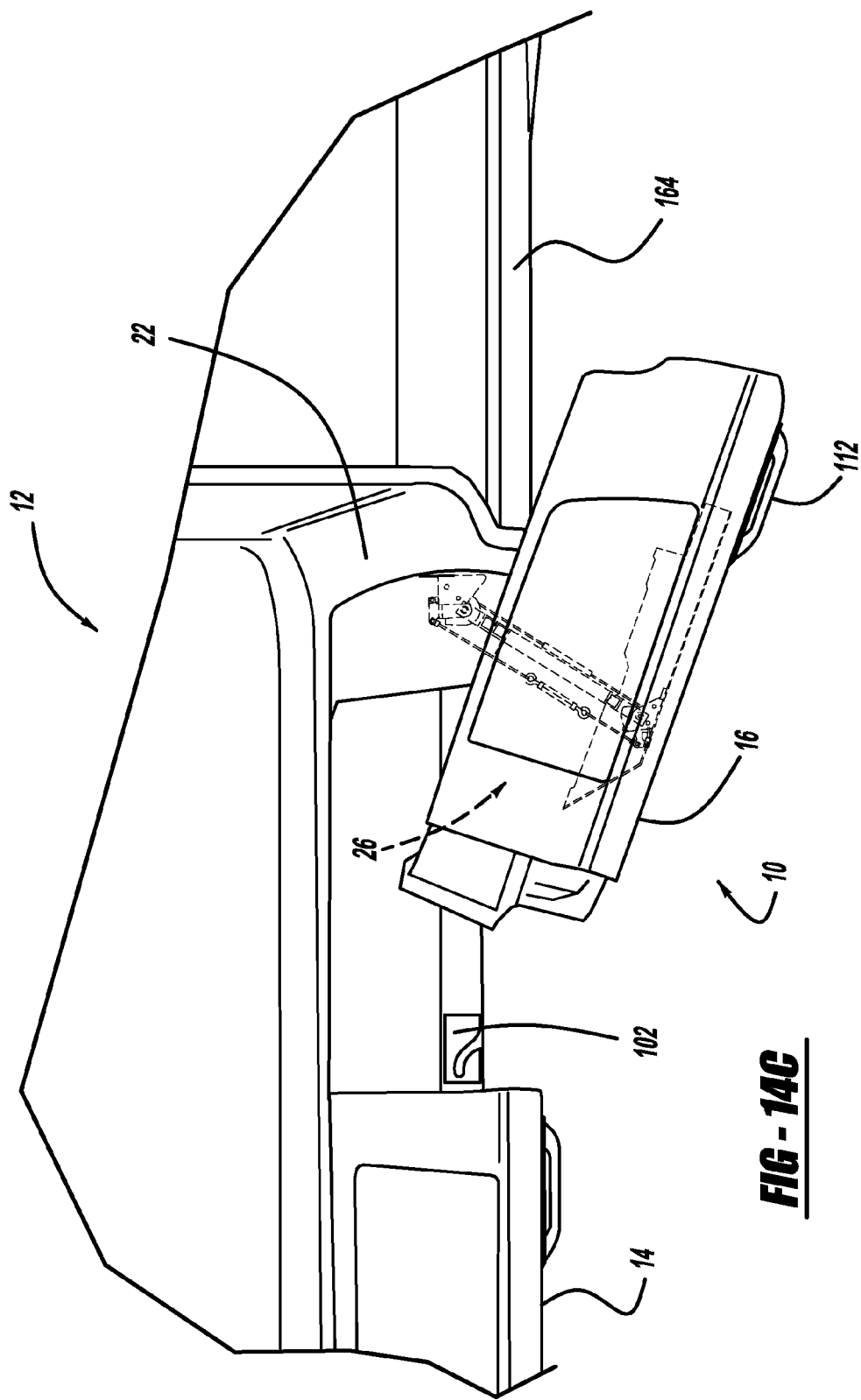

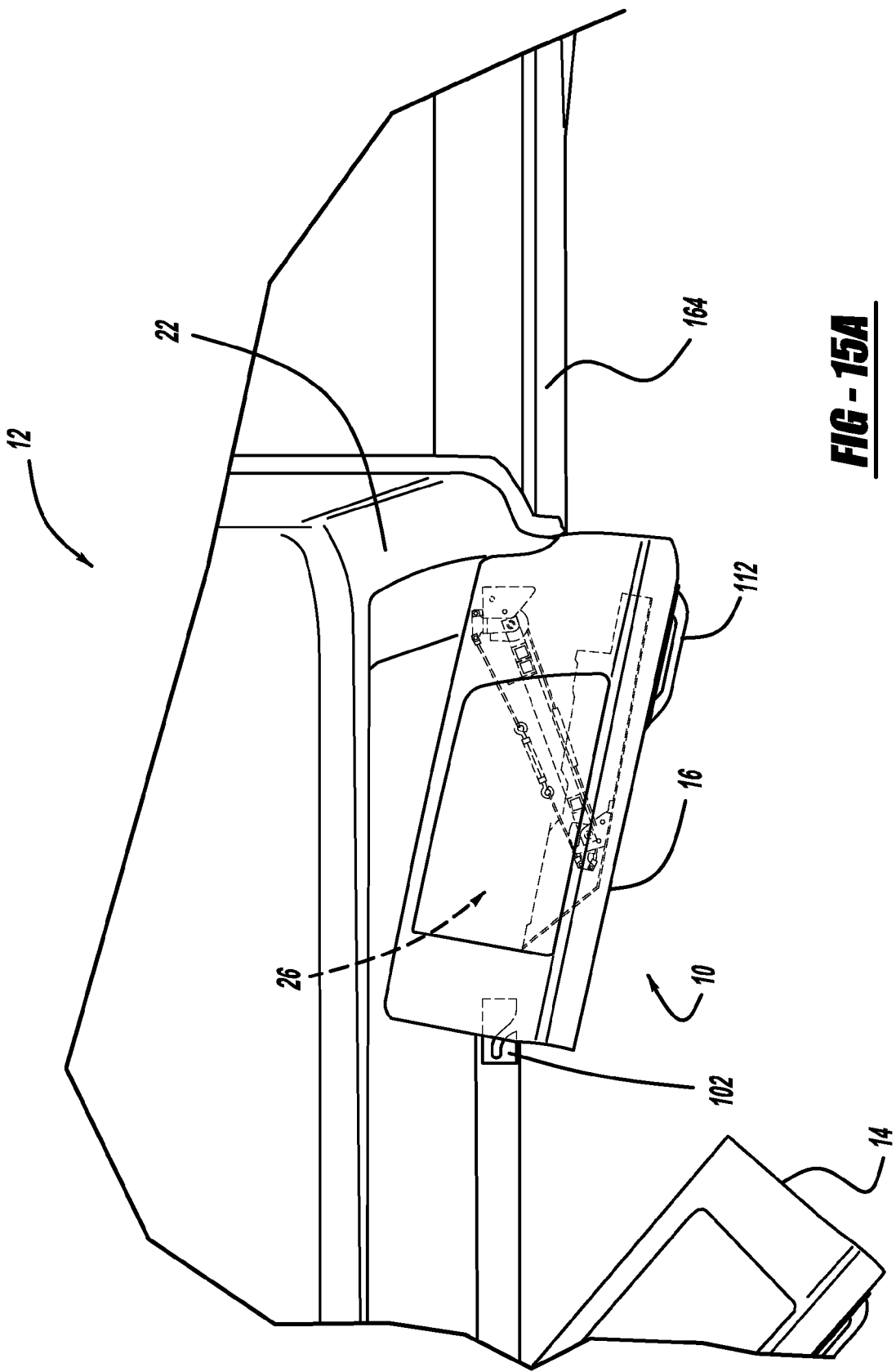

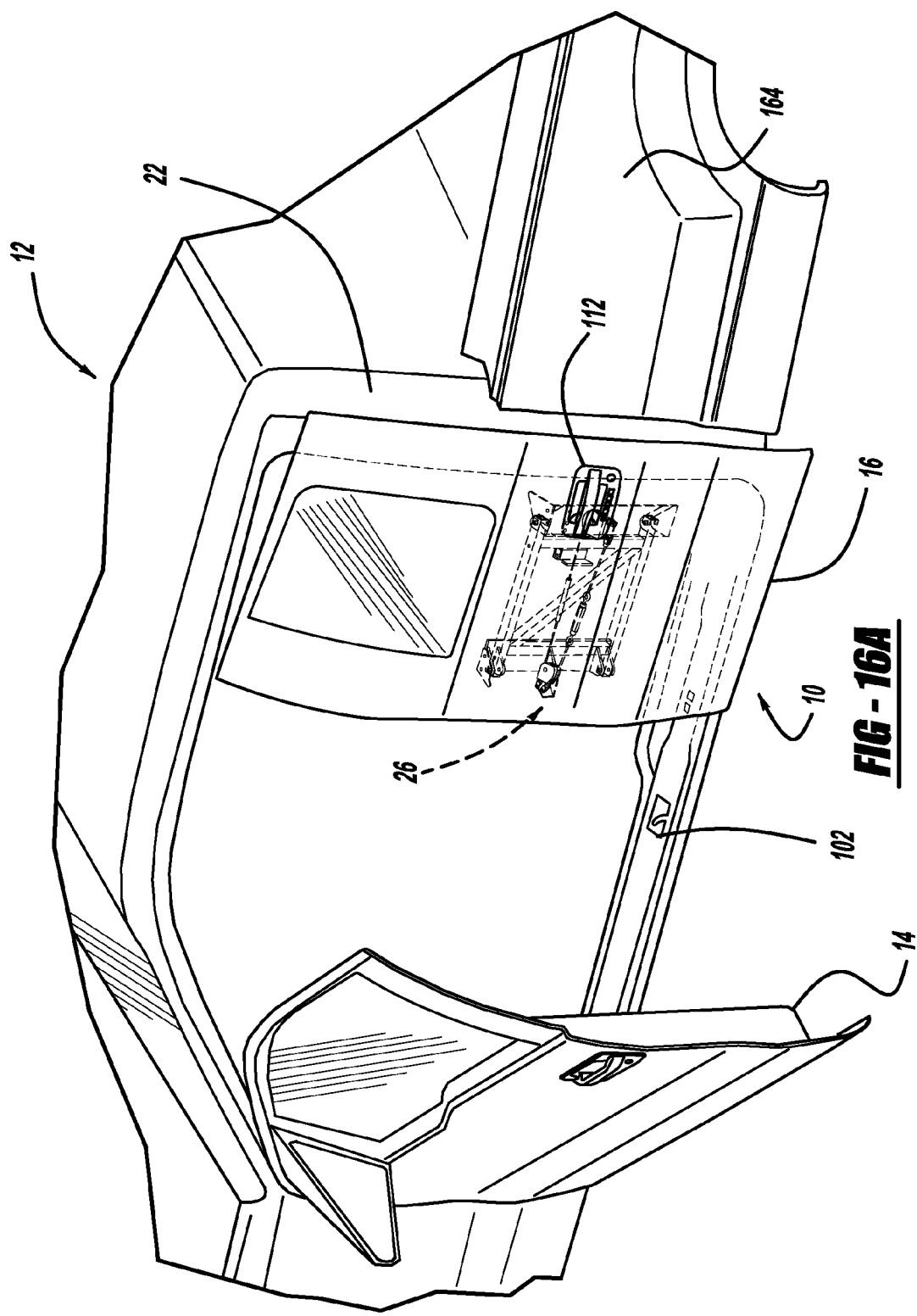

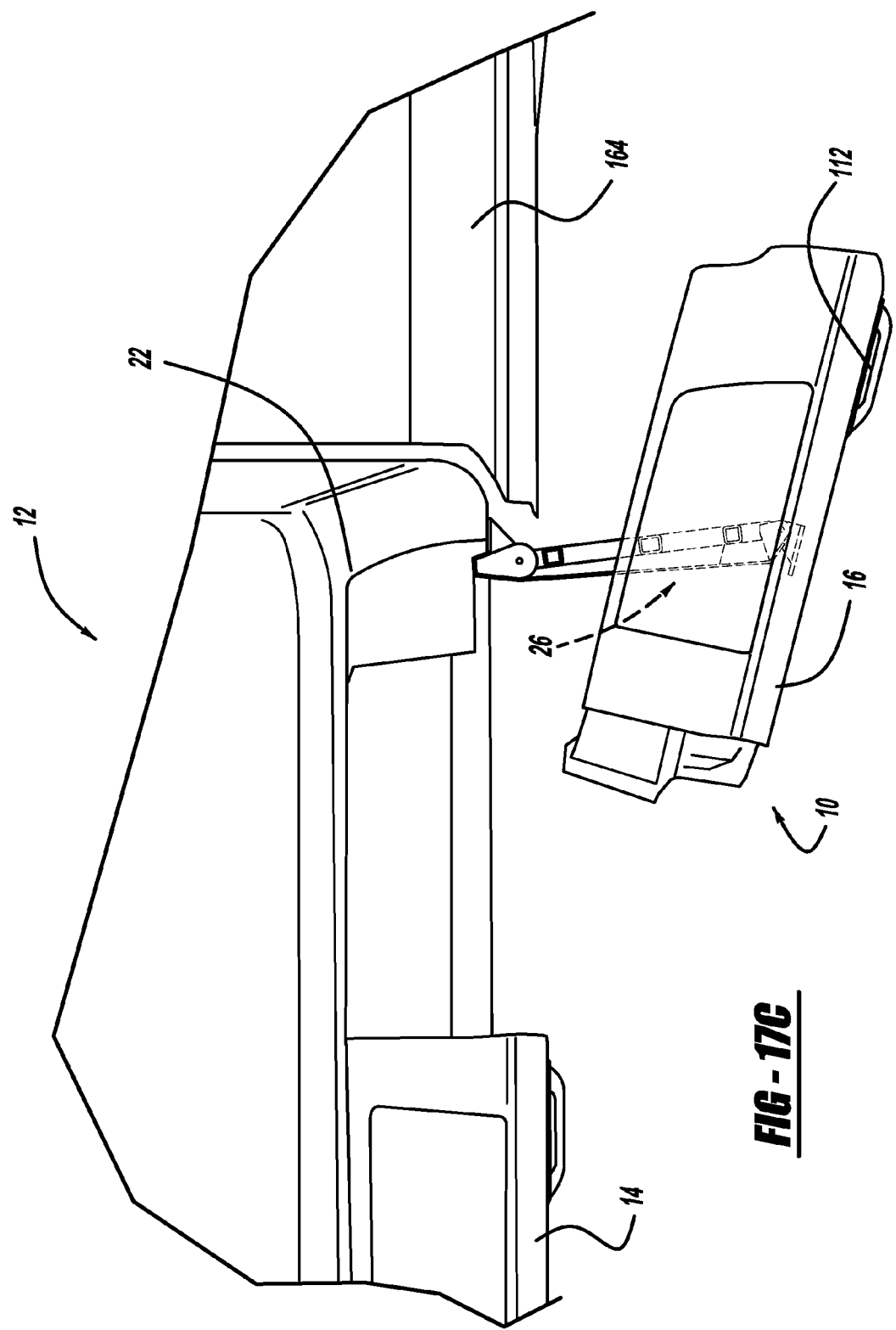

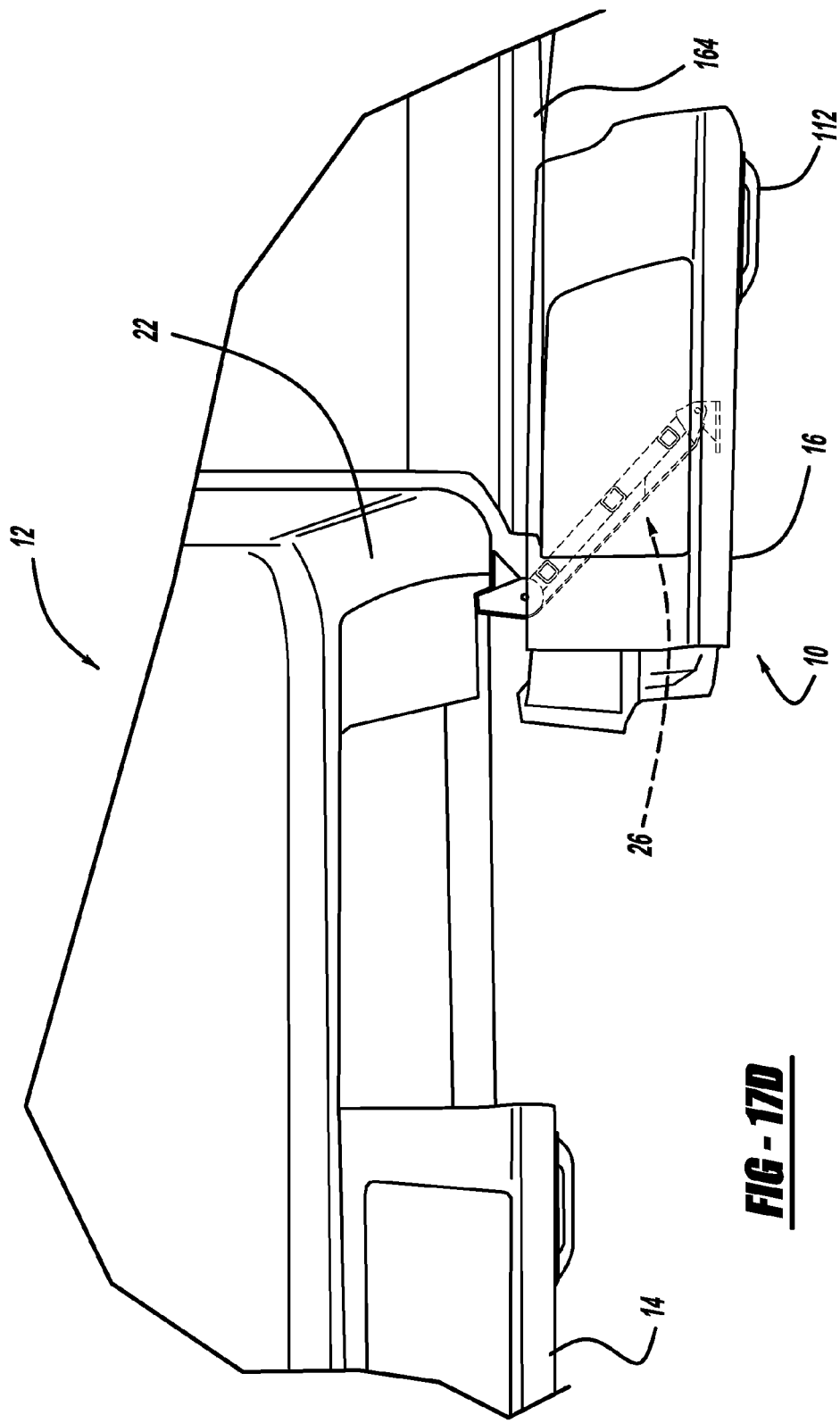

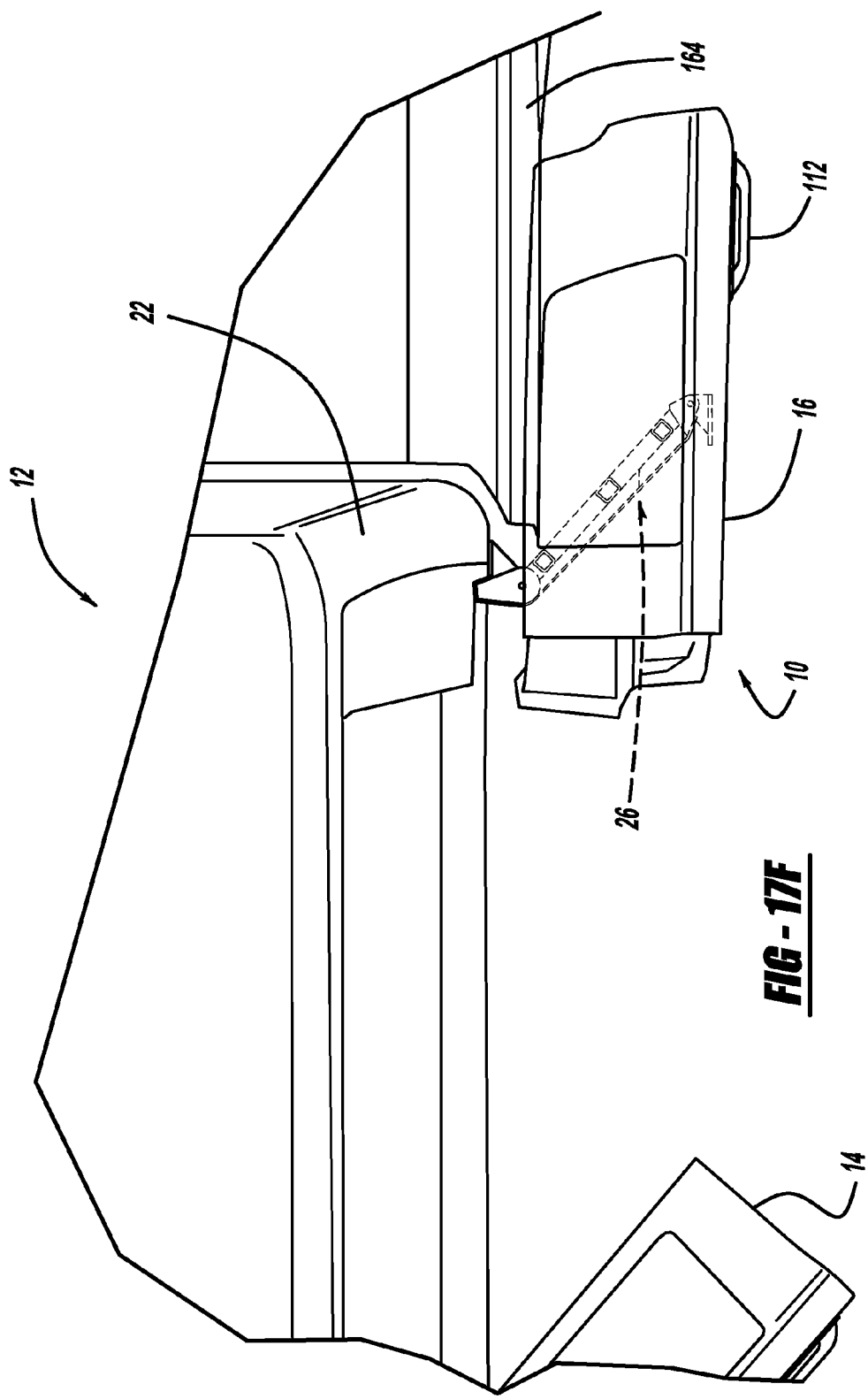

VEHICLE DOOR BELT AND CAM ARTICULATING MECHANISM

FIELD OF THE INVENTION

The invention relates generally to vehicle door movement control devices, and, more particularly, to a mechanism for enabling vehicle door articulation, for example, in a pickup truck, with or without a B-pillar, with the mechanism permitting opening and closing of a door with or without an adjacent door being opened.

BACKGROUND OF THE INVENTION

As is known in the art, automobile designs are governed by a variety of ergonomic and operational factors. For doors and other such components, the design is generally based on ergonomic factors such as exterior appearance, and the location and visibility of hinges, latches and adjacent components, and operational factors such as the ingress/egress opening provided, the maximum clearance required for opening/closing a door, and crash performance.

For pick-up trucks, sport-utility vehicles (SUVs) and other such vehicles which are designed to accommodate ingress/egress of several passengers and also provide means for transport of large goods, the ingress/egress opening and maximum clearance required for opening/closing a door can be of particular importance. For example, a pick-up truck having front and back driver/passenger doors may include a C-pillar mounted rear door which pivots relative to the C-pillar in a similar manner as the A-pillar mounted front door to thus provide a relatively large and unobstructed ingress/egress opening without the intermediate B-pillar. Due to the large size, in particular the door length (width when open), of a typical pick-up truck, driver/passenger ingress/egress can become particularly restrictive, if not impossible, if a vehicle is parked adjacent to the truck and is sufficiently close to prevent a person from boarding or loading to enter the area between the front and rear doors (when open), invariably known as parking lot entrapment. A typical truck with front and back (rear) doors will include a B-pillar mounted rear door, which pivots relative to the B-pillar in a manner similar to the A-pillar mounted front door. This design does not suffer to the same extent from parking lot entrapment, but is still restricted as regards ingress/egress due to limitations of the door opening when parked adjacent to other vehicles.

In an effort to address such parking lot entrapment concerns, a host of sliding or articulating rear door designs, such as the design disclosed in U.S. Pat. No. 6,183,039 to Kohut, have been proposed.

Specifically, referring to FIGS. 1-11 of Kohut, Kohut discloses pivot and slide door system (20) having pivot assembly (60) to pivot door (36) outward from a closed position disposed within door opening (26) to a pivot position spaced from vehicle body (24). Pivot assembly (60) includes a pair of lower arms (64) pivotally attached to support member (62). Lower arms (64) have one end disposed within channel (65) of support member (62) and are attached to support member (62) by pin (66). Pivot assembly (60) includes at least one upper arm (68), aligned with front lower arm (64). Upper arm (68) extends laterally and is pivotally connected to support strap (70) by pin (72). Pivot and slide door system (20) includes lower slide assembly (76), connected to lower arms (64) to allow door (36) to slide rearward to allow ingress/egress via door opening (26). Lower slide assembly (76) includes lower track (78) extending longitudinally along a lower portion of door (36). Upper slide assembly (96), connected to upper arm (68), includes upper track (98) extending longitudinally along an upper portion of door (36). Interlock assembly (110) is used to lock and release lower slide assembly (76) to lower pivot assembly (60) to prevent and allow door (36) to slide fore/aft. Interlock assembly (110) prevents door (36) from moving in a fore/aft direction before lower pivot assembly (76) has moved to its fully open rotational position.

Thus, while pivot and slide door system (20) of Kohut provides for articulating and sliding movement of door (36), system (20) and especially interlock assembly (110) nevertheless are relatively complex in design, and thus susceptible to failure. As system (20) is illustrated for use with a single car door, Kohut does not discuss whether door (36) is pivotally operable with a vehicle having a front door.

It would therefore be of benefit to provide a mechanism for permitting opening and closing of both a C-pillar mounted, rear-hinging rear door, and a conventional B-pillar mounted rear door with or without a front door being opened, with the mechanism including a minimal number of components for facilitating manufacture, assembly and operation of the overall mechanism and adjacent components.

SUMMARY OF THE PRESENT INVENTION

In accordance with one aspect of the present invention, drawbacks and deficiencies of prior art articulating door mechanisms are overcome by providing a vehicle door articulating mechanism including an articulating hinge assembly having a hinge arm pivotally mounted via a first hinge mount to a vehicle structure at one end thereof, a vehicle door pivotally mounted via a second hinge mount to the hinge arm at an opposite end of the hinge arm, a first cam mounted to the first hinge mount at one end of the hinge arm, a second cam mounted to the second hinge mount at an opposite end of the hinge arm, and a belt at least partially encircling both the first and second cams. The hinge arm is disposed at first and second angular positions when the vehicle door is respectively disposed in closed and opened positions. The vehicle door articulating mechanism allows the door to articulate away independent of an adjacent vehicle door during initial and continued opening of the vehicle door. The door in the fully opened position is parallel to the vehicle body side.

According to another aspect of the present invention, the vehicle door articulating mechanism may include a spring and a tensioner on the belt to facilitate appropriate rotation of the mechanism to open the door and bring it parallel with the vehicle side.

According to further aspects of the present invention, a vehicle compartment closure articulating mechanism including one or more articulating hinge assemblies is provided, which include one or more hinge arms pivotally mounted via a first hinge mount to a vehicle body structure at one end thereof, a vehicle door pivotally mounted via a second hinge to the hinge arm at an opposite end of the hinge arm, a first cam mounted to the first hinge mount at one end of the hinge arm, a second cam mounted to the second hinge mount at the opposite end of the hinge arm, and a belt at least partially encircling both the first and second cams. The hinge arm may be disposed at first and second angular positions when the compartment closure is respectively disposed in closed and opened positions. The vehicle door articulating mechanism thus provides articulating movement of the vehicle door during initial and continued opening thereof of the vehicle door relative to a vehicle body structure. The vehicle door in the fully opened position is parallel to the vehicle body structure.

These and other aspects, objects, and features of the present invention will be understood and appreciated by those skilled in the art upon studying the following specification, claims, and appended drawings.

BRIEF DESCRIPTION OF DRAWINGS

In the drawings:

FIGS. 12A and 12B are views of the rear door articulating mechanism of FIG. 1, illustrating the mechanism in a partial extended position (i.e. rear door just beginning to open), FIG. 12B is shown in top view;

FIG. 13B is a top view;

FIGS. 14A-14D are top views of a vehicle including the rear door articulating mechanism of FIG. 1, respectively illustrating the rear vehicle door in a closed, just beginning to open, opened midway and fully opened positions, with the adjacent front vehicle door closed;

FIGS. 15A and 15B are top views of a vehicle including the rear door articulating mechanism of FIG. 1, respectively illustrating the rear vehicle door in a just beginning to open and fully opened positions, with the front vehicle door open;

FIGS. 16A and 16B are isometric views of a vehicle including the rear door articulating mechanism of FIG. 1, respectively illustrating the rear vehicle door in a just beginning to open and fully opened positions, with the front vehicle door open;

FIGS. 17A through 17D are top views illustrating a first embodiment of belt and cam arrangements respectively illustrating rear door in closed, just opened (15°), approximately 90°, and 180° positions, with front door closed;

FIGS. 17E and 17F are top views illustrating a first embodiment of articulating mechanism (hidden) respectively illustrating rear door in just opened and fully extended positions, with front door opened.

DETAILED DESCRIPTION OF PREFERRED EMBODIMENTS

Figure 1:
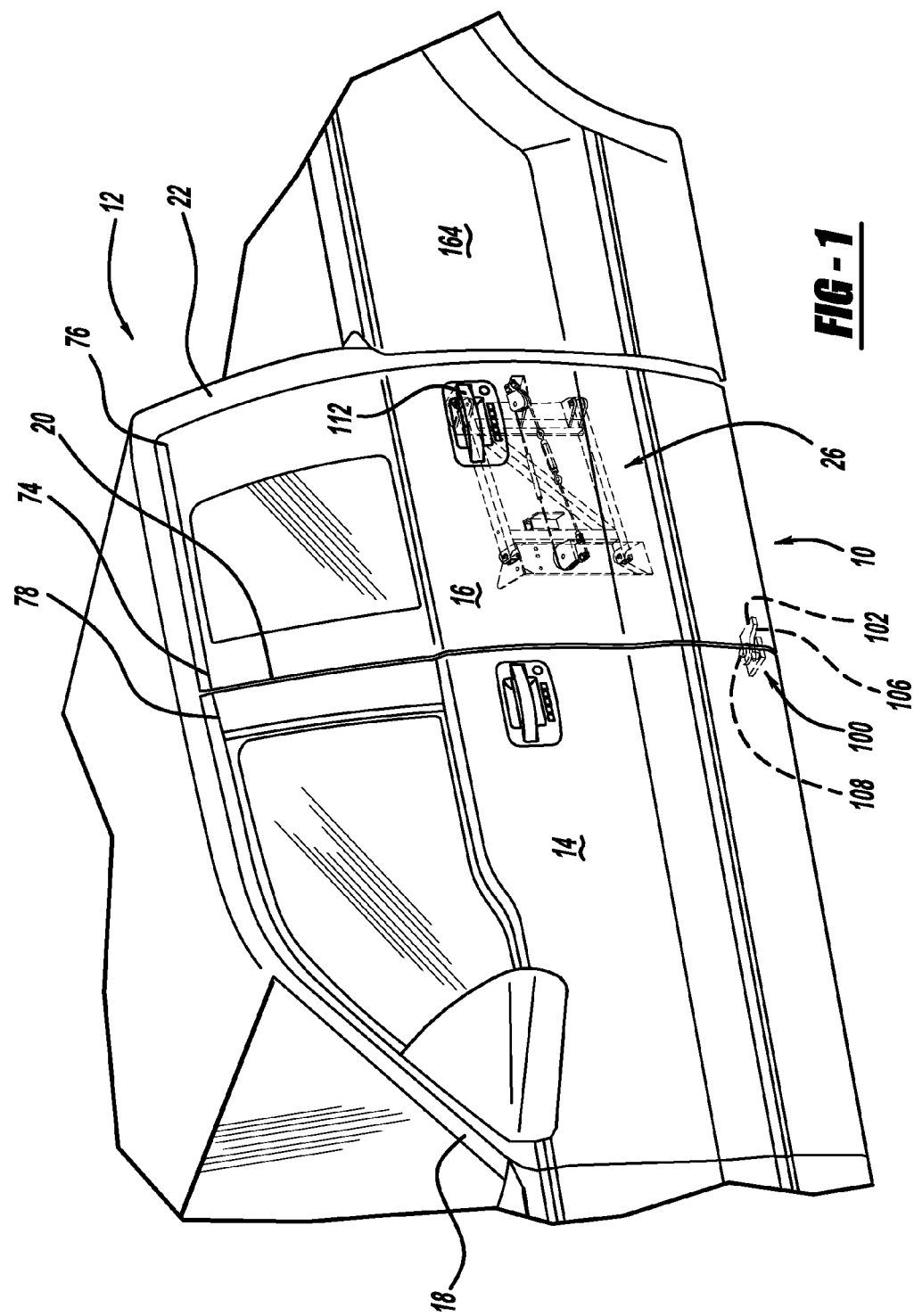
FIG. 1 is an isometric view of a door articulating mechanism for a rear door, according to one embodiment, illustrating the mechanism in an assembled configuration and installed onto a vehicle (the mechanism being shown in hidden)

Referring now to the drawings wherein like reference numerals designate corresponding parts throughout the several views, FIGS. 1-18D illustrate a mechanism for vehicle rear door articulation according to one embodiment, generally designated "rear door articulating mechanism 10."

Figure 2:
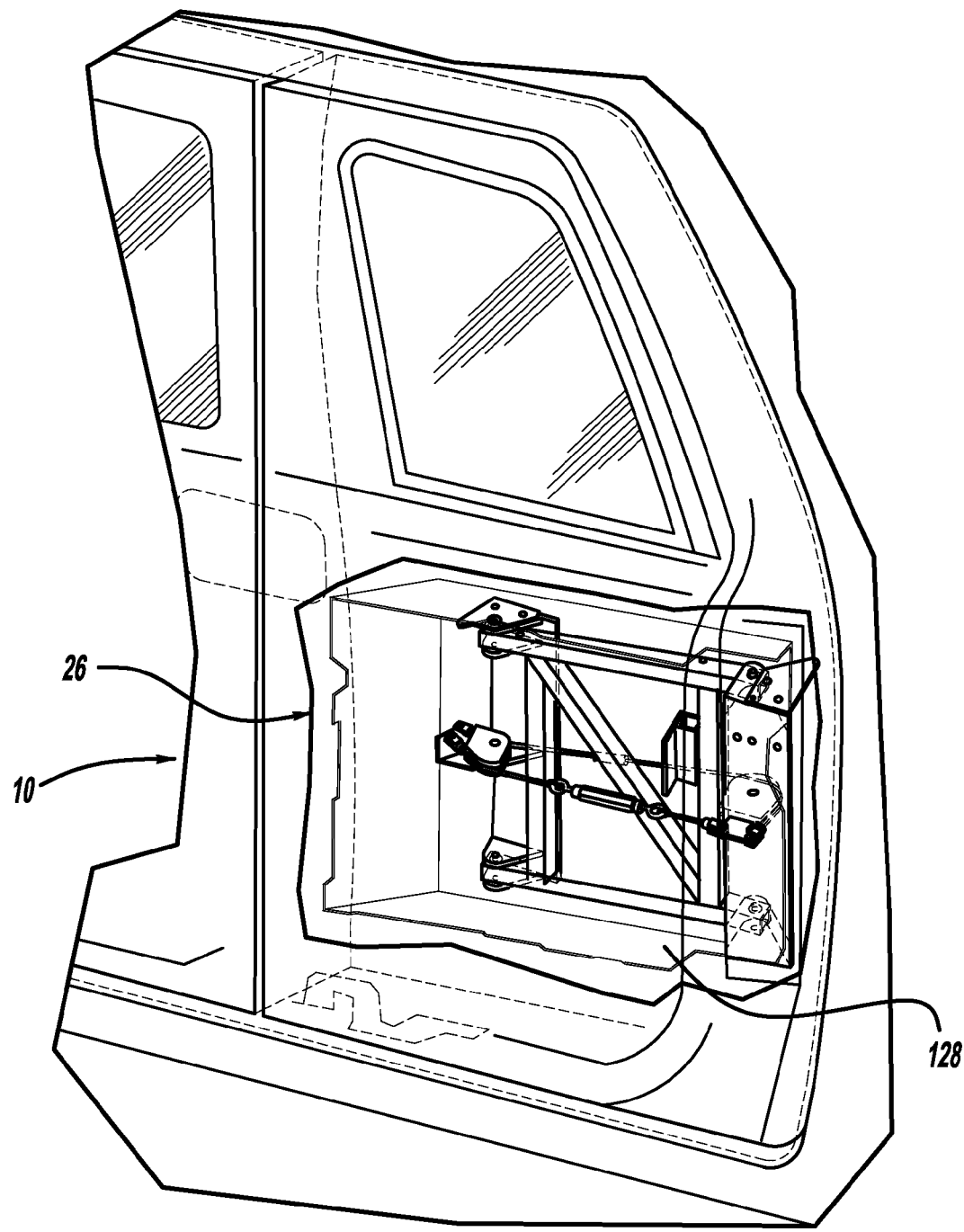
FIG. 2 is an isometric cutout view of the rear door articulating mechanism of FIG. 1, illustrating the mechanism installed onto a vehicle.
Figure 3:
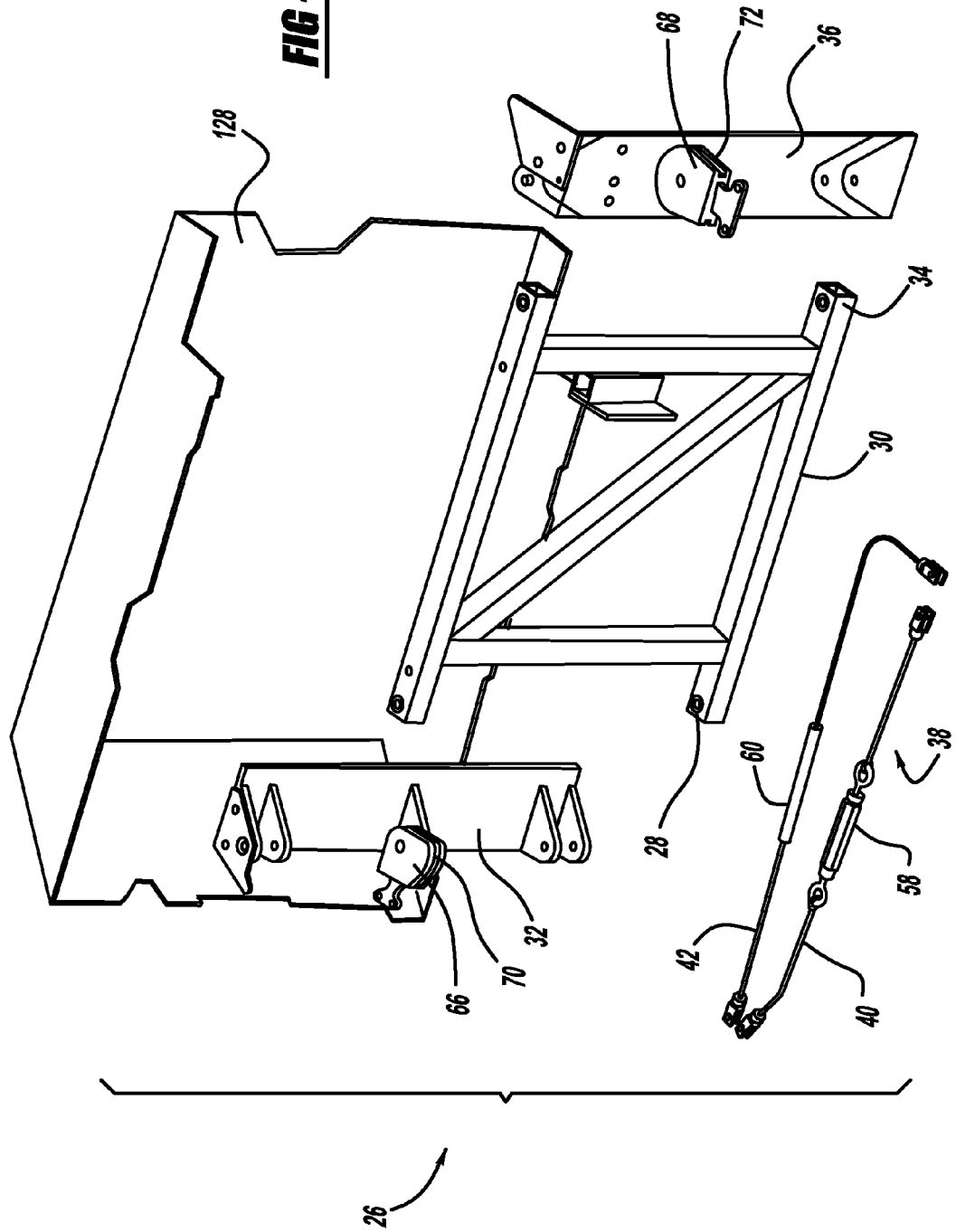
FIG. 3 is an exploded view of the rear door articulating mechanism of FIG. 1, illustrating the various sub-components of the mechanism.
Figure 4:
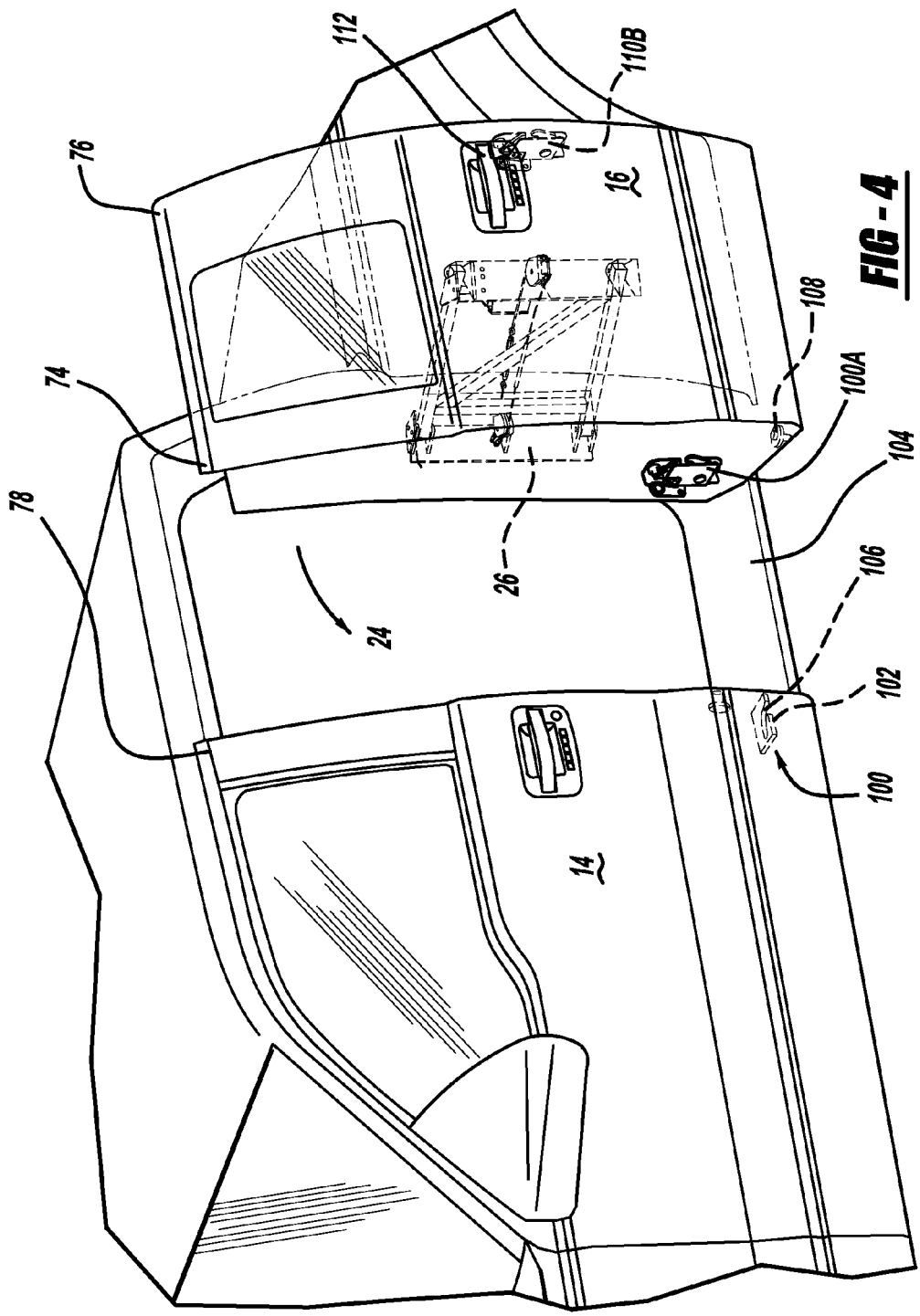
FIG. 4 is an isometric view of the rear door articulating mechanism of FIG. 1, illustrating the mechanism installed onto a vehicle and with a front vehicle door closed and an adjacent rear vehicle door fully opened.
Figure 5:
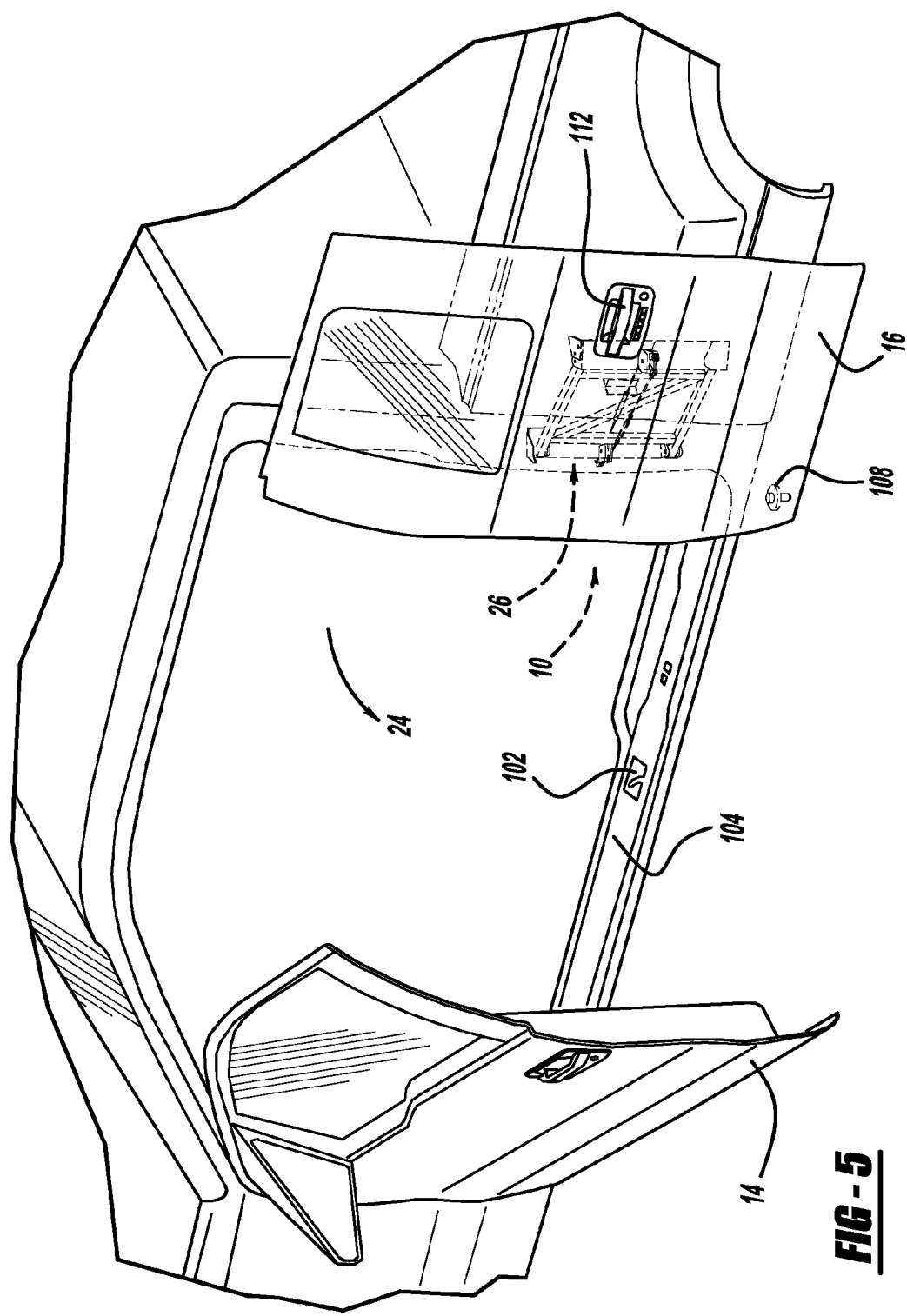
FIG. 5 is an isometric view of the rear door articulating mechanism of FIG. 1, illustrating the mechanism installed onto a vehicle and with the adjacent front and rear vehicle doors fully opened.
Figure 6:
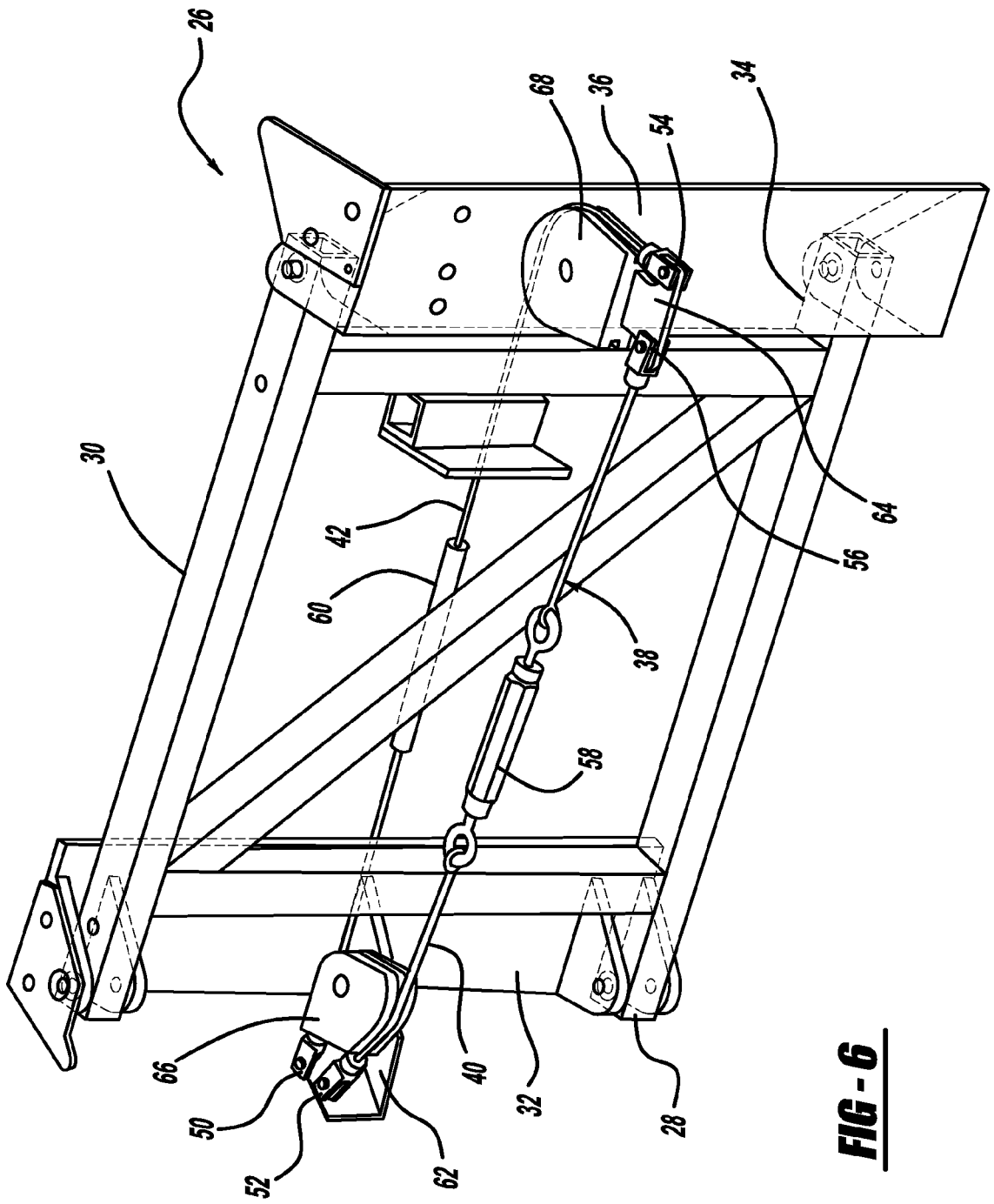
FIG. 6 is an enlarged isometric view of a belt and cam articulating mechanism according to one embodiment.
Figure 7A:
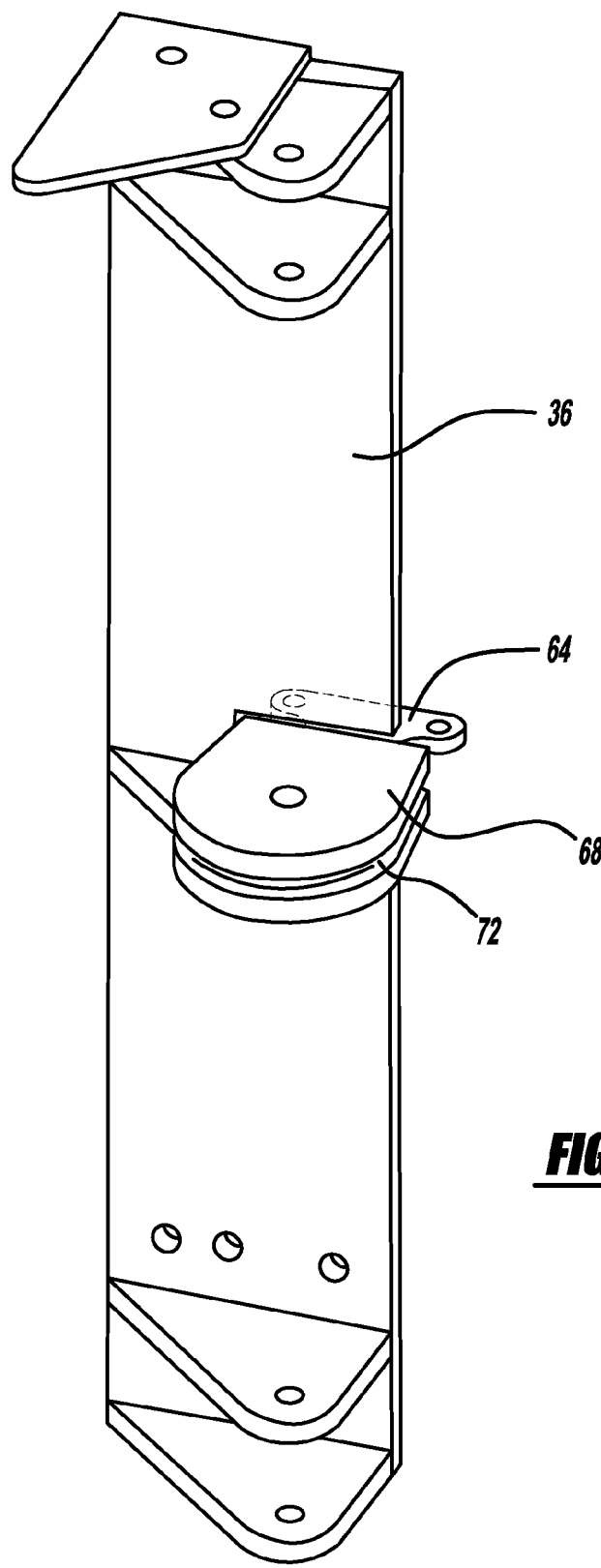
FIG. 7A is an enlarged isometric view of one side of a hinge mount for attachment of the rear door articulating mechanism of FIG. 1 to a vehicle structure (e.g., C-pillar)
Figure 7B:
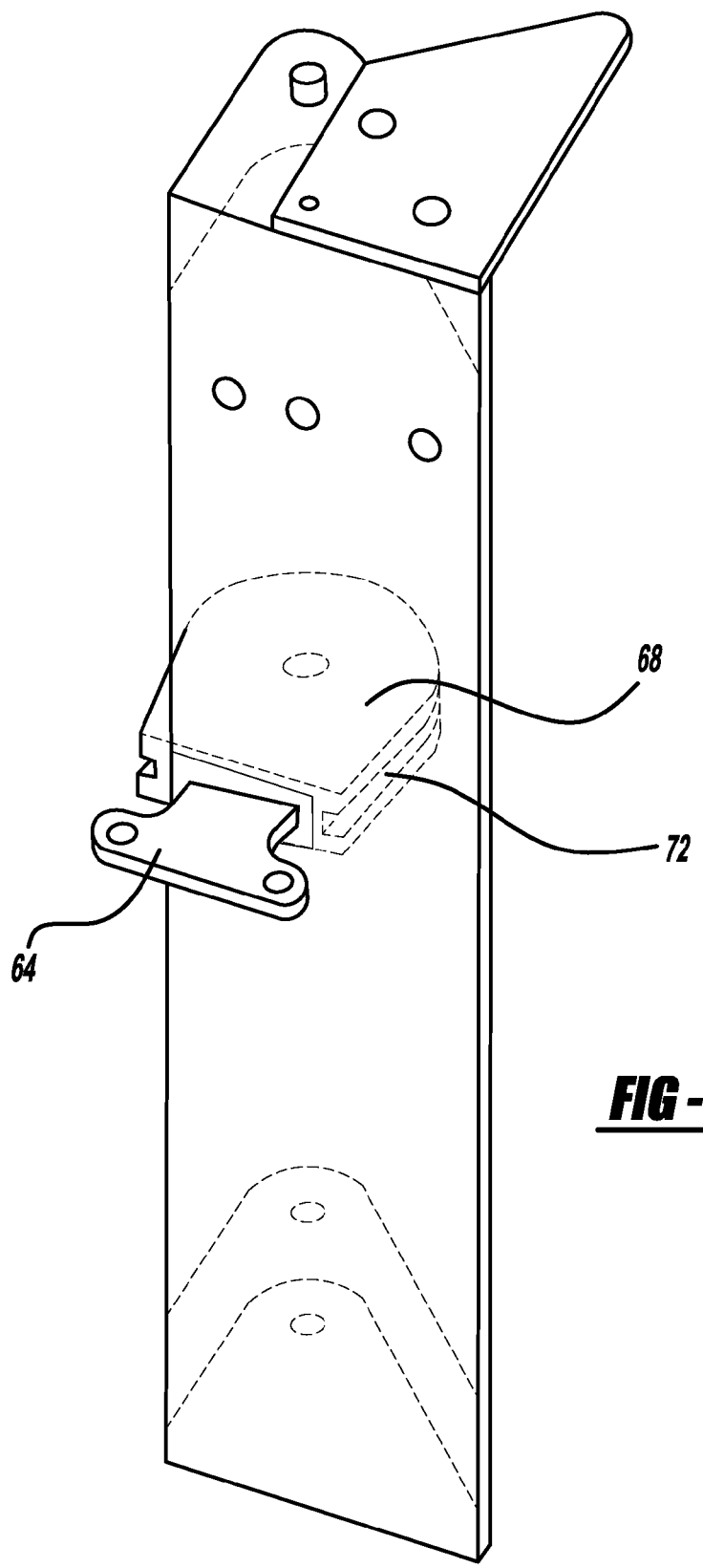
FIG. 7B is an enlarged isometric view of an opposite side of a hinge mount of the rear door articulating mechanism of FIG. 1 to a vehicle C-pillar.
Figure 8:
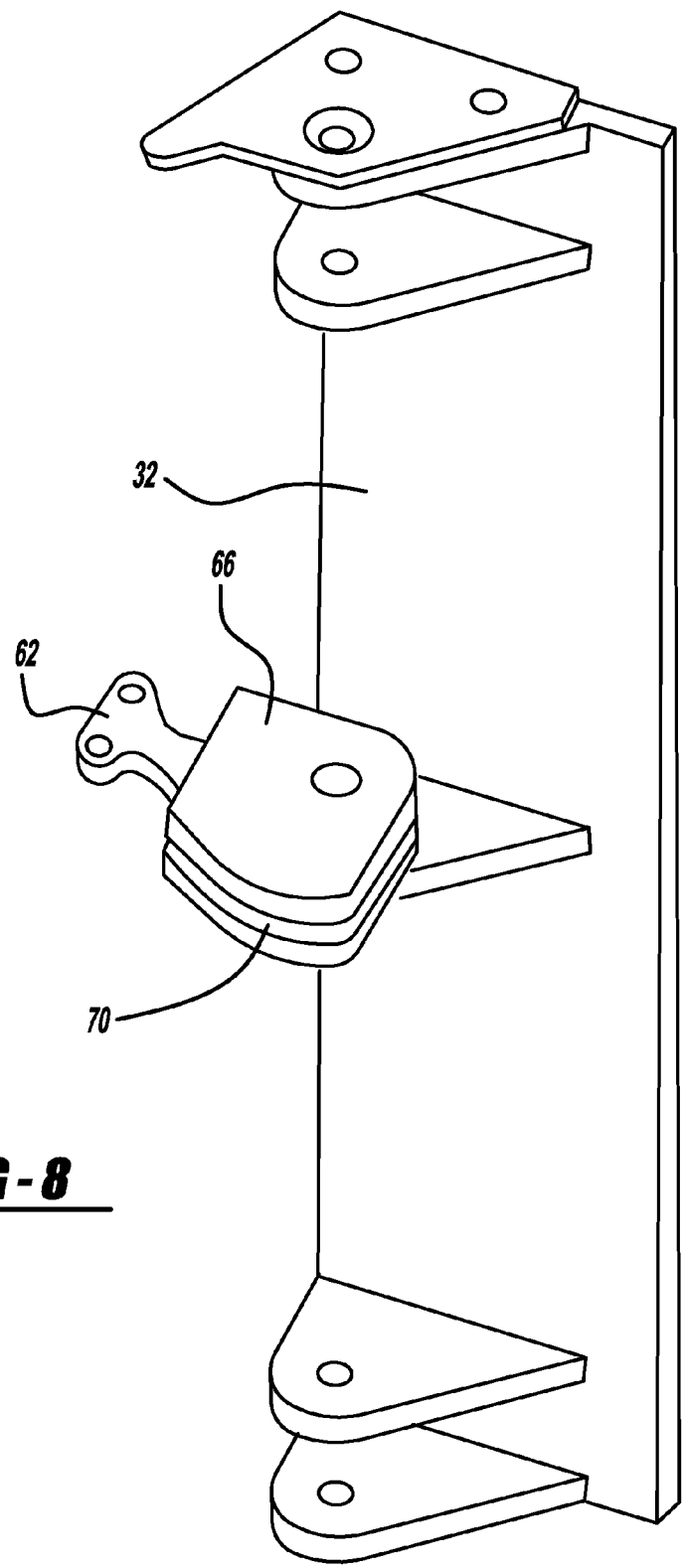
FIG. 8 is an enlarged isometric view of a hinge mount of the articulating mechanism to a vehicle rear door.
Figure 9:
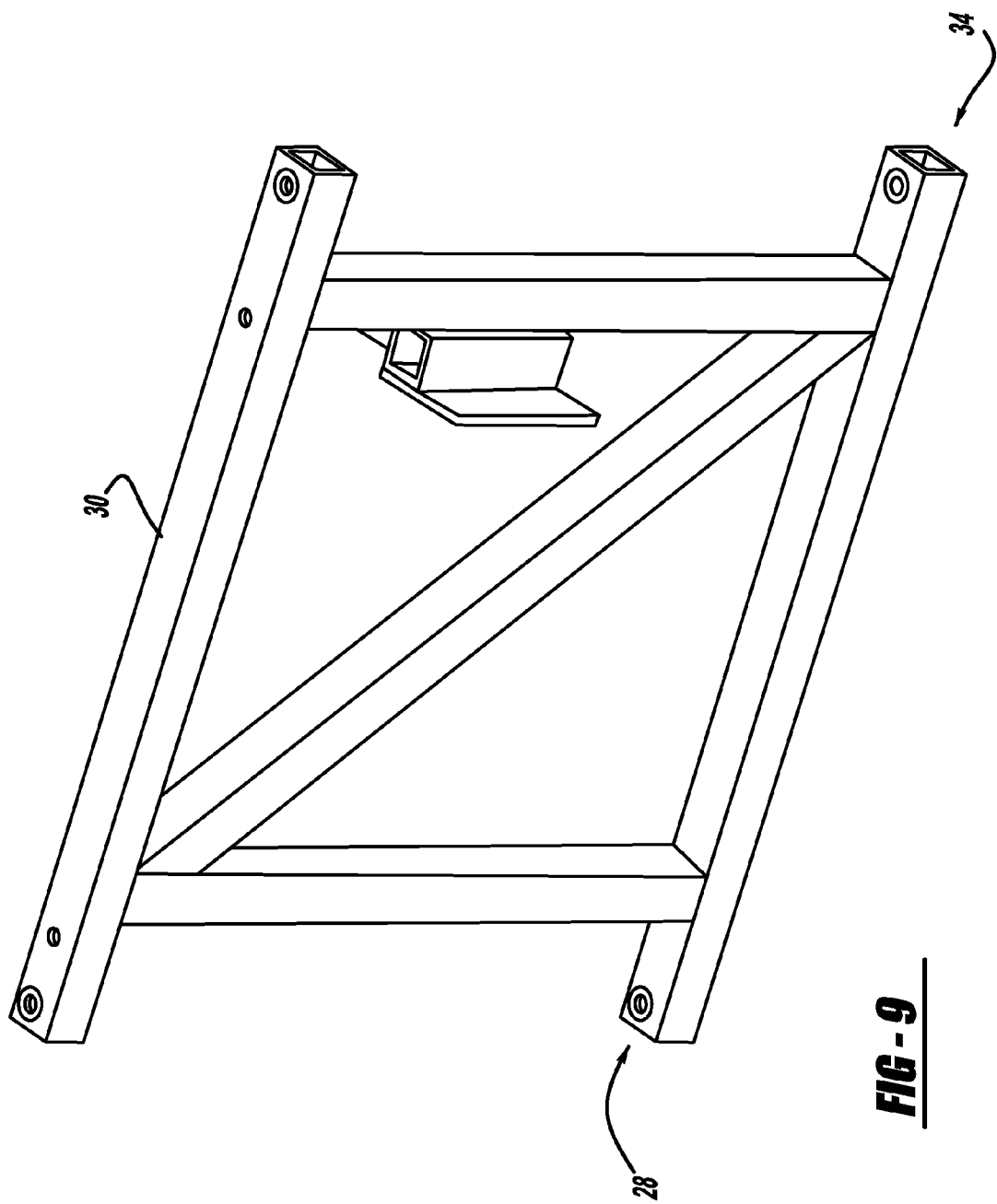
FIG. 9 is an enlarged isometric view of a hinge arm for facilitating articulation of a vehicle rear door.
Figure 10:
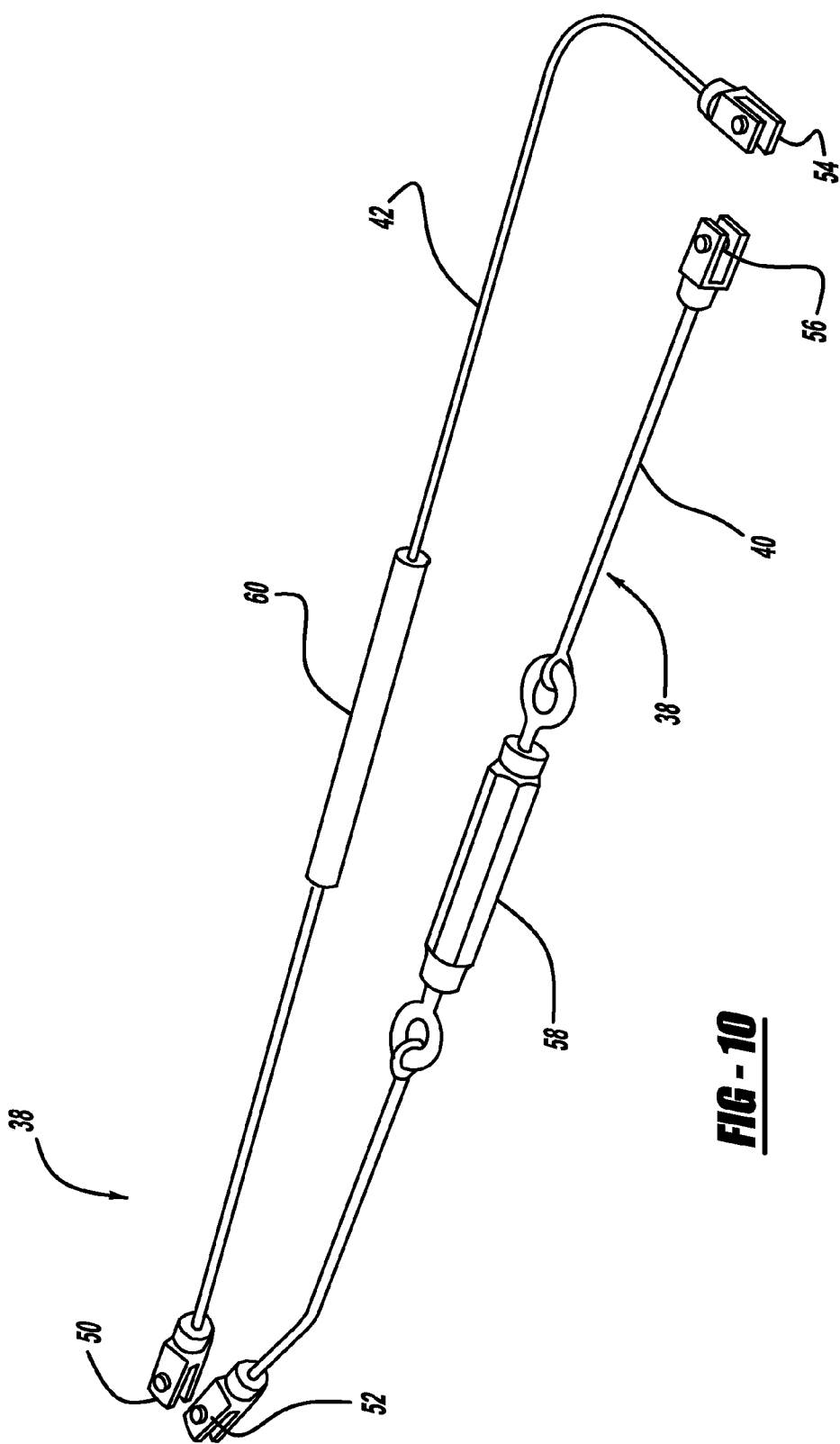
FIG. 10 is a belt in a preferred embodiment according to one embodiment.

Referring to FIGS. 1-3, rear door articulating mechanism 10 may generally be mounted onto a vehicle 12 including front and rear doors 14, 16. In the exemplary embodiment illustrated, vehicle 12 may be a pickup truck including A, B and C pillars 18, 20, 22. As shown in FIGS. 4 and 5, and described in greater detail below, in order to facilitate ingress and egress into and from passenger compartment 24 of vehicle 12, rear door articulating and sliding mechanism 10 may allow for complete opening of rear door 16, with an adjacent front door 14 being fully opened or closed.

The various sub-components of rear door articulating mechanism 10 will now be described in detail with reference to FIGS. 1-10.

Specifically, as shown in FIGS. 1-6, rear door articulating mechanism 10 may generally include an articulating hinge assembly 26 pivotally interconnected at end 34 of hinge arm 30 with a vehicle structure shown as the C-pillar 22 according to one embodiment, via a hinge mount 36 and further pivotally interconnected at end 28 of hinge arm 30 via a hinge mount 32. Those skilled in the art would readily appreciate in view of this disclosure that mechanism 10 may be installed onto a vehicle D-pillar (not shown), or another body structure for facilitating articulated opening/closing of a door or another cover. Hinge mounts 32, 36 may respectively include pivot pins (not shown) about which each hinge arm 30, pivotally rotates. As shown in FIGS. 1-3, hinge mounts 32, 36 may be attached to vehicle structure (e.g., C-pillar 22) and rear door 16, respectively by means of riveting, welding, and the like.

Referring next to FIGS. 3, and 6-13B, in the exemplary embodiment illustrated, door side first cam 66 is mounted to hinge mount 32 and includes belt mount 62. Vehicle second cam 68 is mounted to hinge mount 36 and includes belt mount 64. Belt 38 includes section 40 disposed between hinge arm 30 and compartment 24 when rear door 16 is closed. Section 40 may include a tensioner 58. Belt 38 also includes a section 42 disposed between hinge arm 30 and rear door 16 when rear door 16 is closed. Section 42 may include a spring 60. Sections 40 and 42 may each include single or multiple connected components. Connectors 50, 52 connect belt 38 to belt mount 62. Connectors 54, 56 connect belt 38 to belt mount 64. As readily evident to those skilled in the art, cams 66, 68 may be shaped in a variety of configurations based on the articulation requirements of rear door 16, and the orientation of door 16 relative to C-pillar 22. Also readily evident to those skilled in the art, belt 38 may be a cable, wire, timing belt, or any continuous cord. Belt 38 is of a defined length according to the longest path around cam 66, 68 arrangement to fit grooves 70, 72 within cams 66, 68, wherein rear door 16 is anchored to C-pillar 22.

As shown in FIGS. 1-4, rear door articulating hinge mechanism 10 may further include a lower guide assembly 100 including guide plate 102 mounted to floor structure 104. In the particular embodiment illustrated, guide plate 102 may include a channel 106 for facilitating guided movement of door 16 having guide pin 108 mounted on an underside thereof and slidably movable within channel 106 during door closing or initial opening. In this manner, whereas articulating hinge assembly 26 controls pivotal movement of rear door 16, lower guide assembly 100 further provides guided movement of door 16 during opening/closing thereof, and adequate alignment with the door latches as discussed in further detail below.

In order to latch/unlatch rear door 16, door 16 may include one or both of front and rear latches 110A and 110B. Front latch 110A is shown provided adjacent the lower end of the door 16 and engageable with striker 111 provided adjacent the lower end of door opening frame. The rear latch 110B may likewise be engageable with striker (not shown). Door 16 may further include a release handle 112 in a conventional manner. As readily evident to those skilled in the art, in order to efficiently open and close door 16, handle 112 may be a pull-type handle as shown, whereby a user may grasp onto handle 112 and pull and slide the rear door 16 to open or close the door 16 as needed.

The opening/closing of rear door 16 will now be described in detail with reference to FIGS. 1-16B (especially FIGS. 4-16B).

Referring to FIGS. 4 and 5, as discussed above, in order to facilitate ingress and egress into and from compartment 24 of vehicle 12, rear door articulating mechanism 10 may allow for complete opening of rear door 16, with front door 14 being fully opened or closed.

Figure 11A:
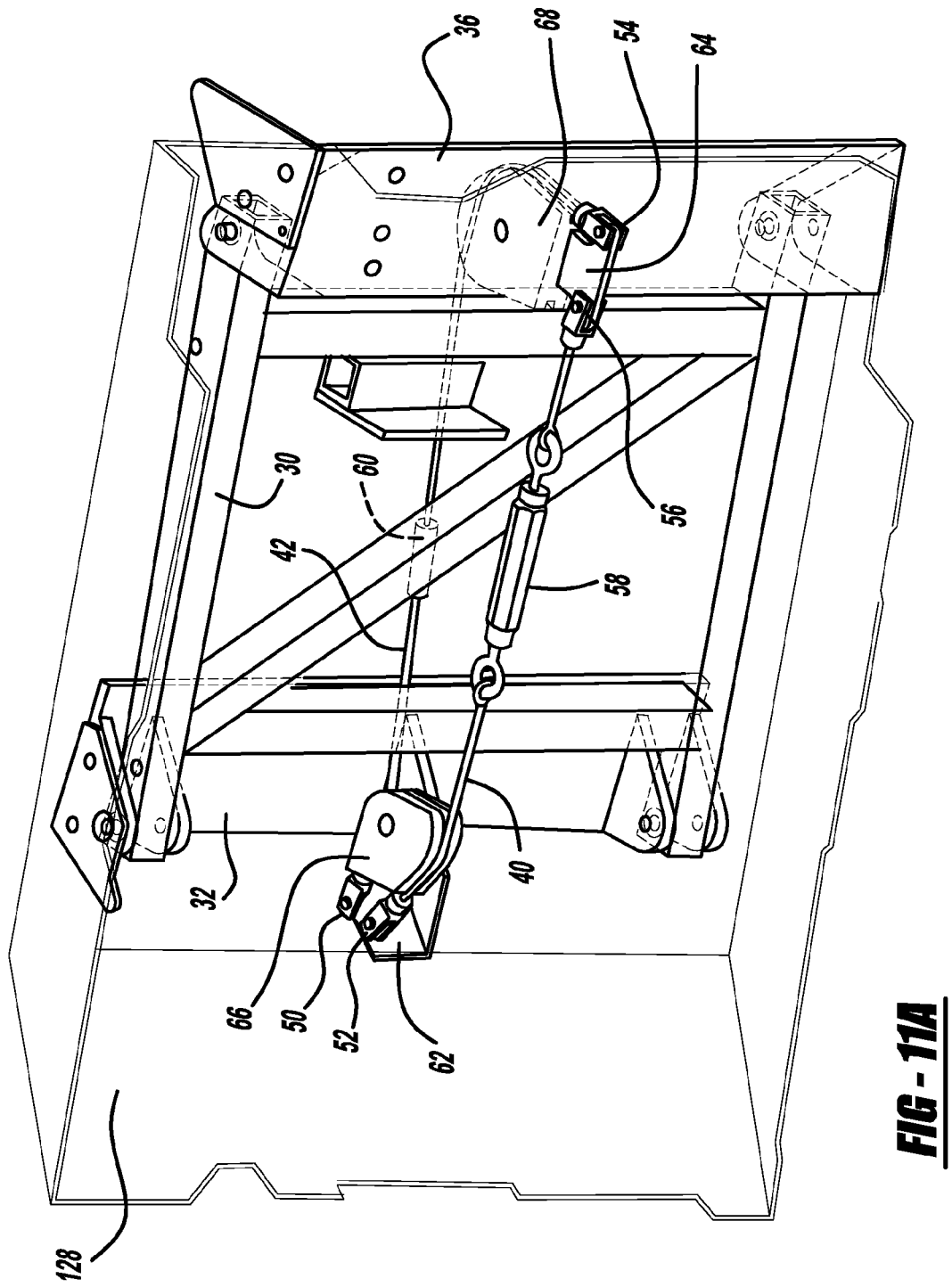
FIG. 11A is a isometric view of the rear door articulating mechanism of FIG. 1, illustrating the mechanism in a fully retracted position (i.e. rear door closed)
Figure 11B:
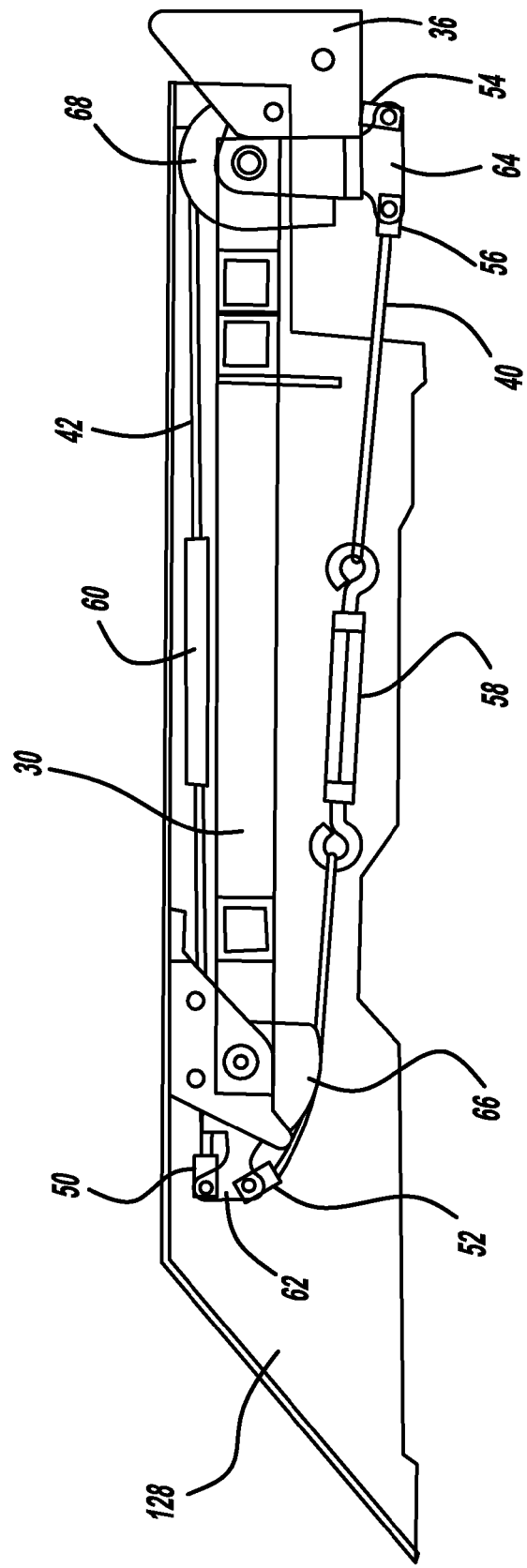
FIG. 11B a top view of rear door articulating mechanism of FIG. 1 shown in isometric view.
Figure 12B:
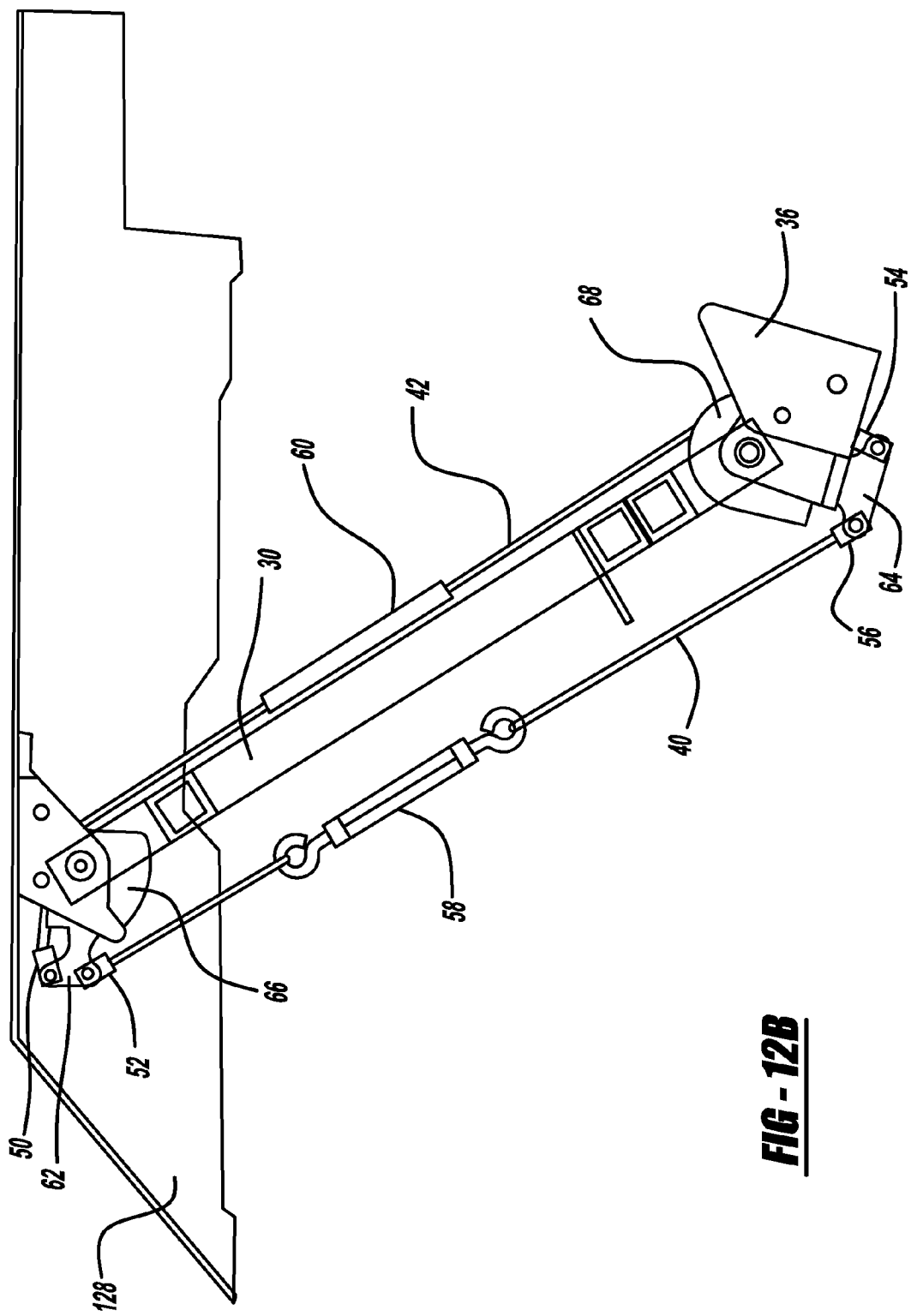
Figure 13A:
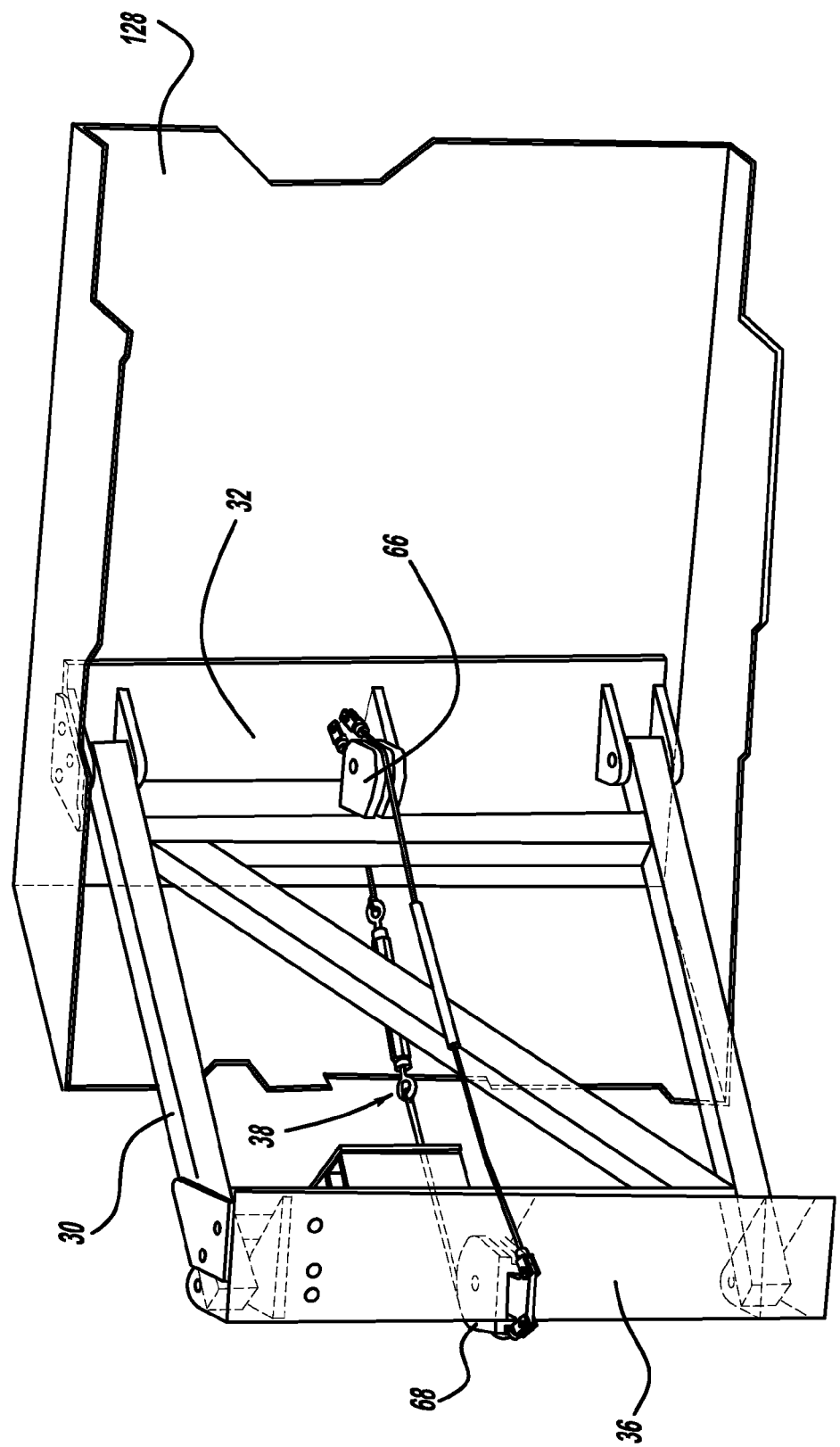
FIGS. 13A and 13B are isometric views of the rear door articulating mechanism of FIG. 1, illustrating the mechanism in a fully extended position (i.e. rear door open)
Figure 13B:
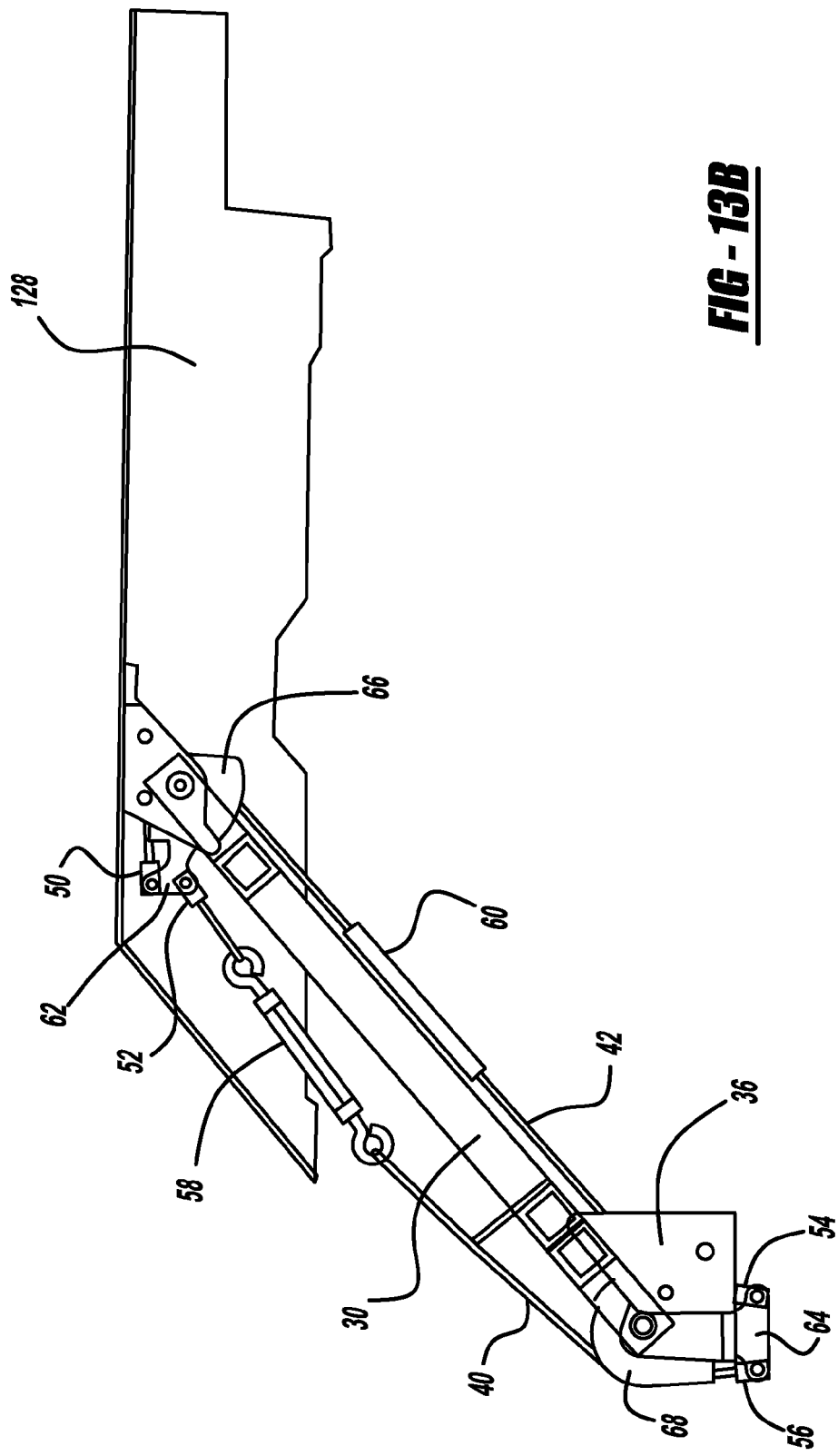

Referring next to FIGS. 11A-13B, articulating hinge assembly 26 may be contained in housing 128. Hinge mount 32 may be mounted to housing 128 through welding, riveting or the like. FIGS. 11A and 11B illustrate hinge assembly 26 in the rest position (i.e. rear door 16 closed). Referring to FIGS. 12A and 12B, as rear door 16 is initially opened, trailing edge 76 of rear door 16 with respect to the body accelerates and causes orientation of the door 16 to move from an open angled position to the position parallel with the vehicle body as shown in FIGS. 13A and 13B.

Figure 14A:
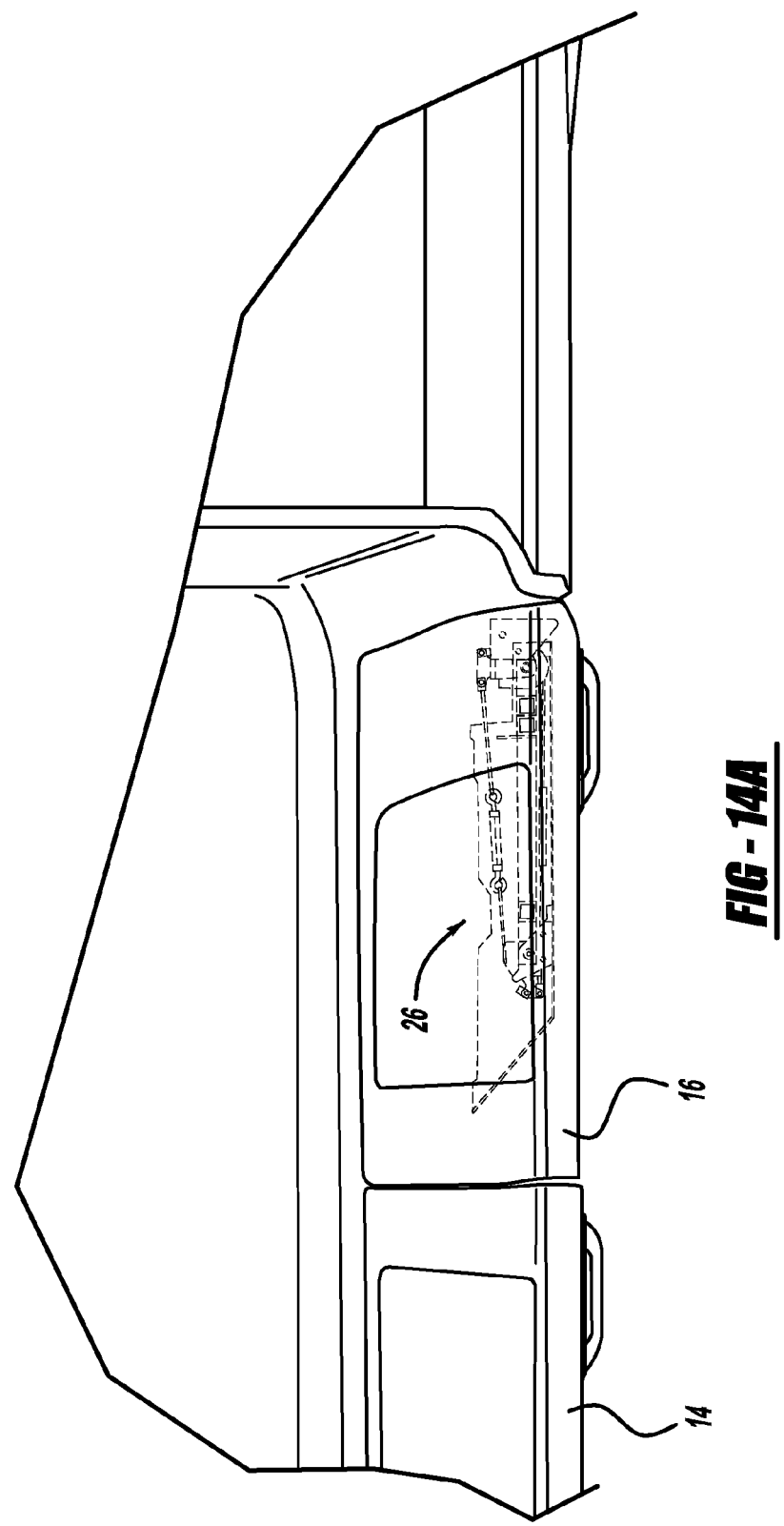
Figure 14B:
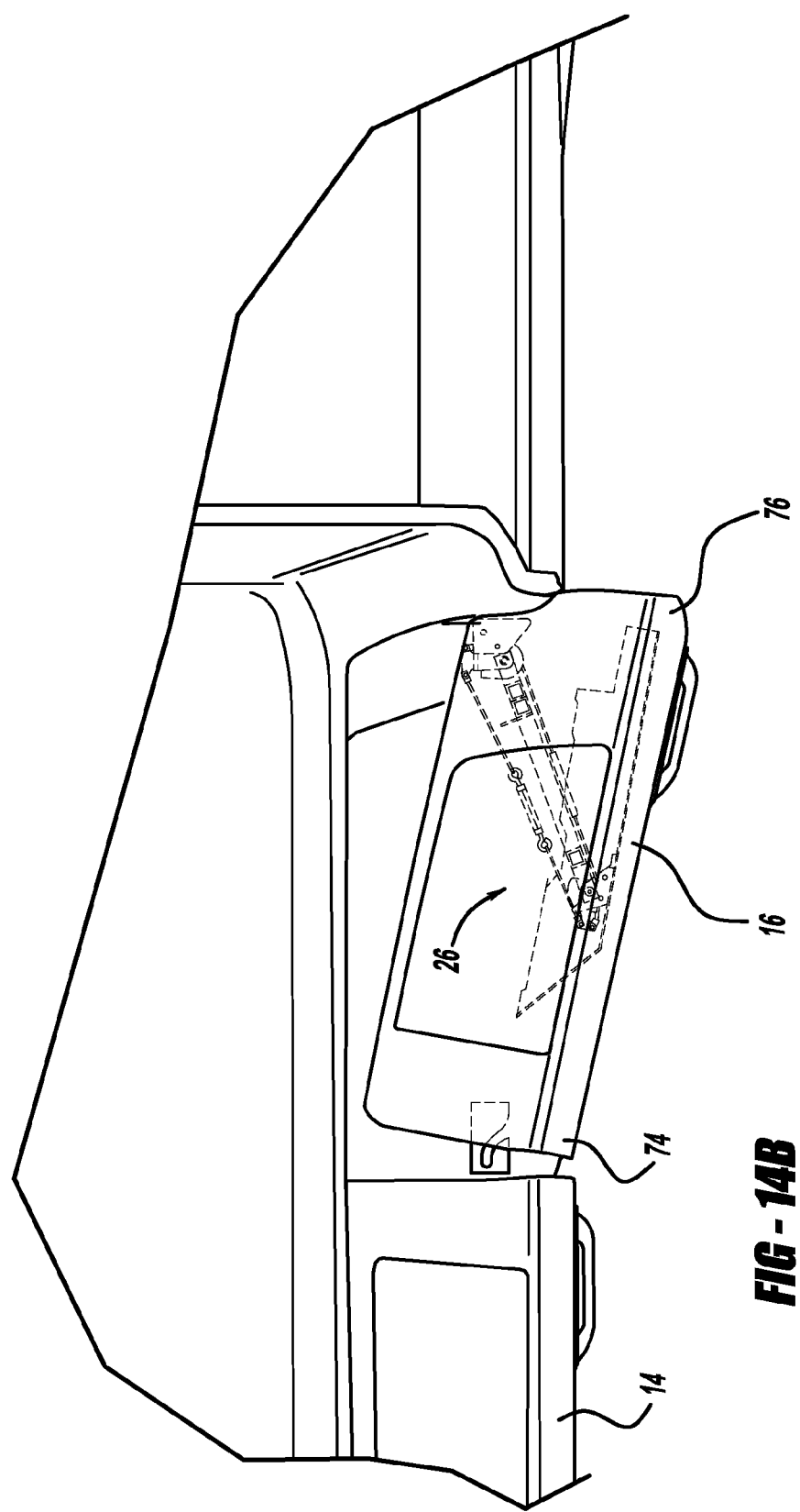
Figure 14D:
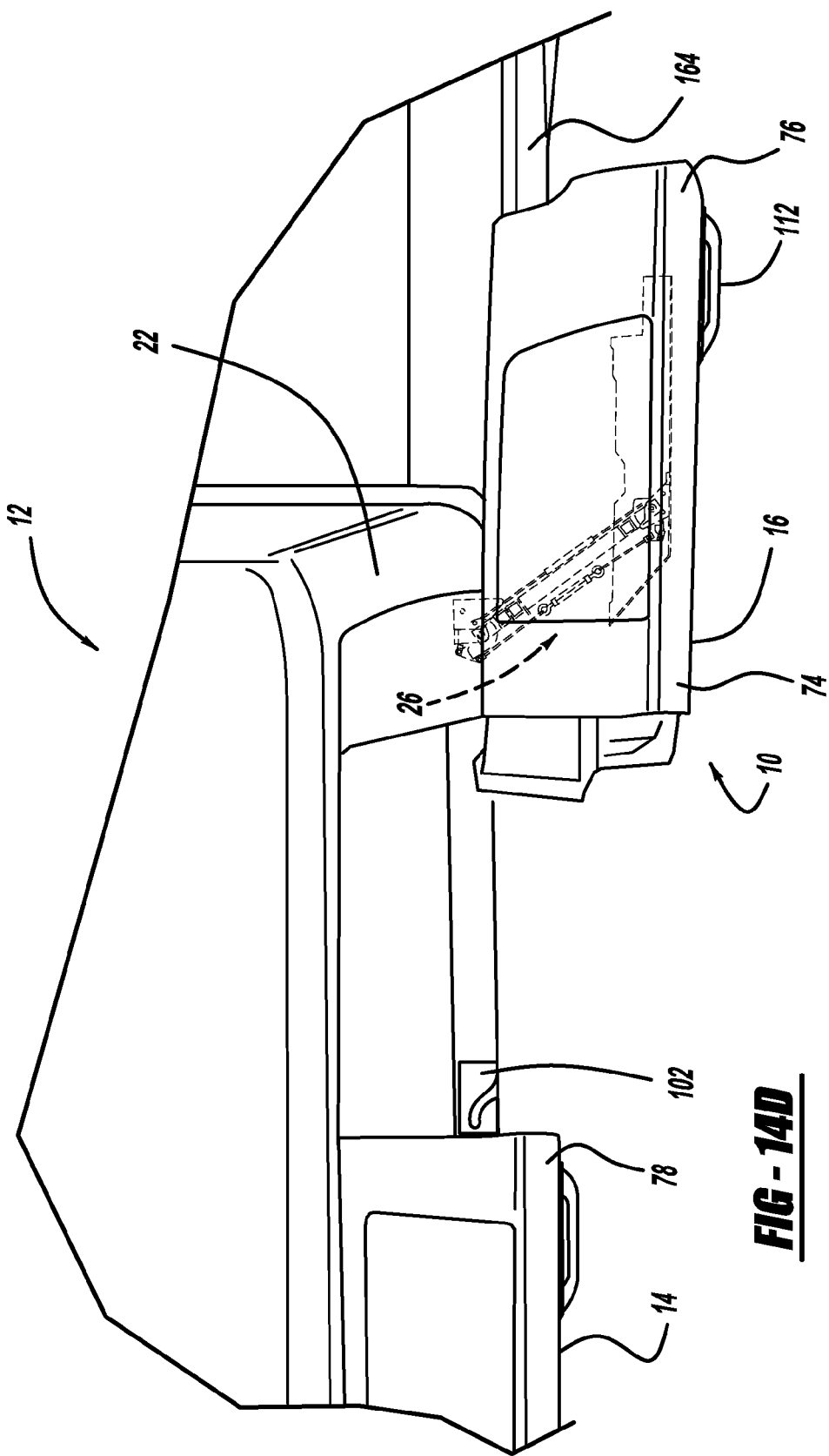

Referring to FIGS. 14A-14D, these figures generally include top views of vehicle 12 with rear door 16 respectively illustrated in a closed, just beginning to open, opened midway and fully opened positions, with front door 14 closed. As shown in FIG. 14B, as rear door 16 is just beginning to open, belt 38 wraps around vehicle side cam 68 thereby allowing increased amount of rotation of door side cam 66. This motion allows the trailing edge 76 of rear door 16 to articulate open and allows leading edge 74 of vehicle rear door 16 to be pulled away, or "untucked" from behind front door 14 that is closed. As shown in FIG. 14C, once rear door 16 has been pulled away, rotation of belt 38 around door side cam 66 and vehicle side cam 68 is at a one-to-one ratio and continues at said ratio until hinge assembly 26 is at approximately 90° from closed position (closed position being that rear door 16 is closed and hinge assembly being at 0°). At this position rear door 16 is open but not parallel to vehicle body 12. To facilitate rear door 16 being parallel to vehicle body 12 when door 16 is fully opened, belt 38 will wrap around door side cam 66 at a more rapid rate than around vehicle side cam 68, thereby allowing correction of angle resulting from initial opening of rear door 16 that cleared leading edge 74 of rear door 16 from trailing edge 78 of front door 14. When hinge assembly 26 is at an angle of approximately 120°, rear door 16 is parallel to the body 164 of the vehicle 12. During operation of belt 38, spring 60 and tensioner 58 may aid in adjusting tension in belt 38 at an amount to facilitate rotation around cams 66, 68.

Figure 15B:
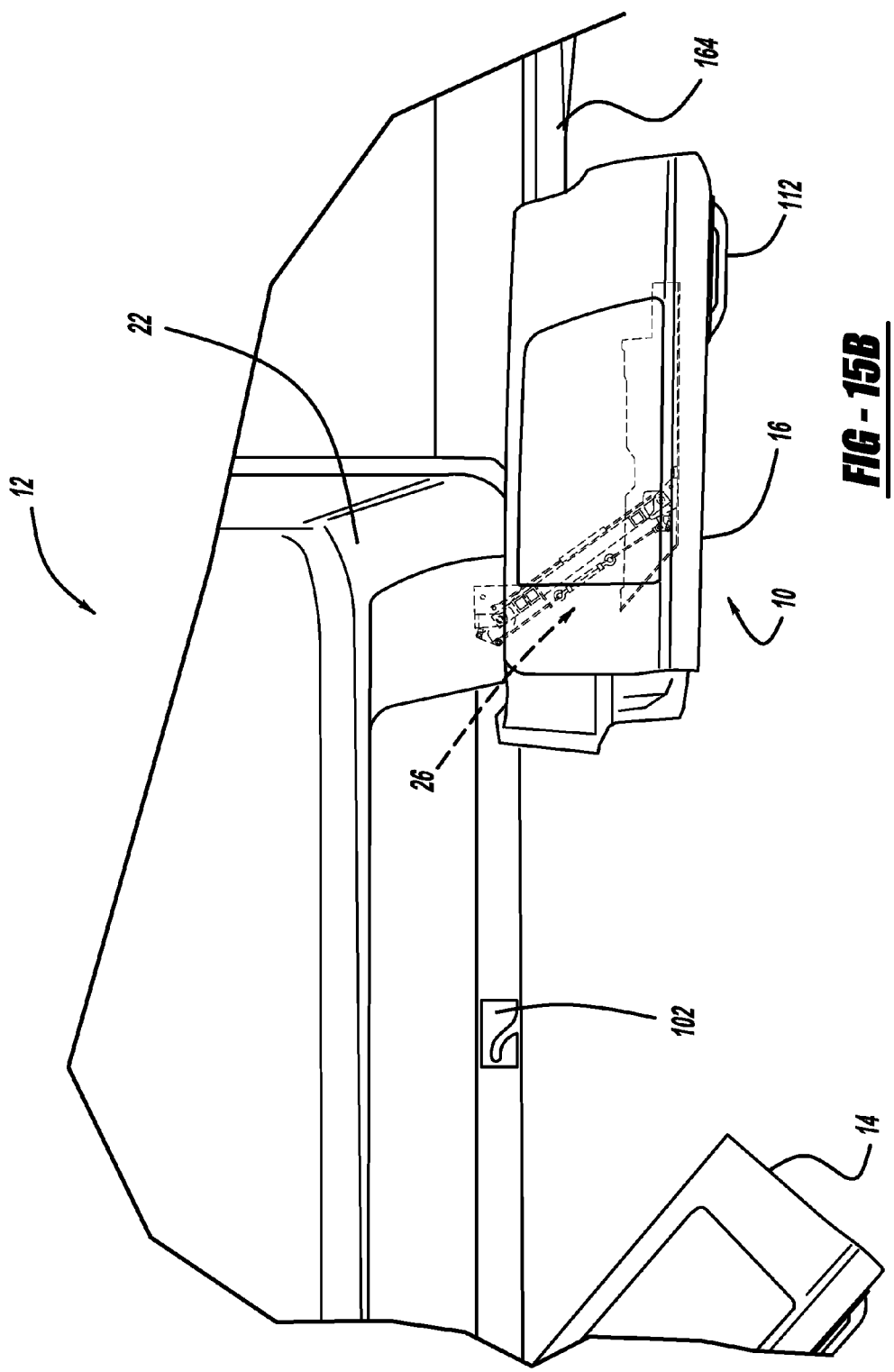
Figure 16B:
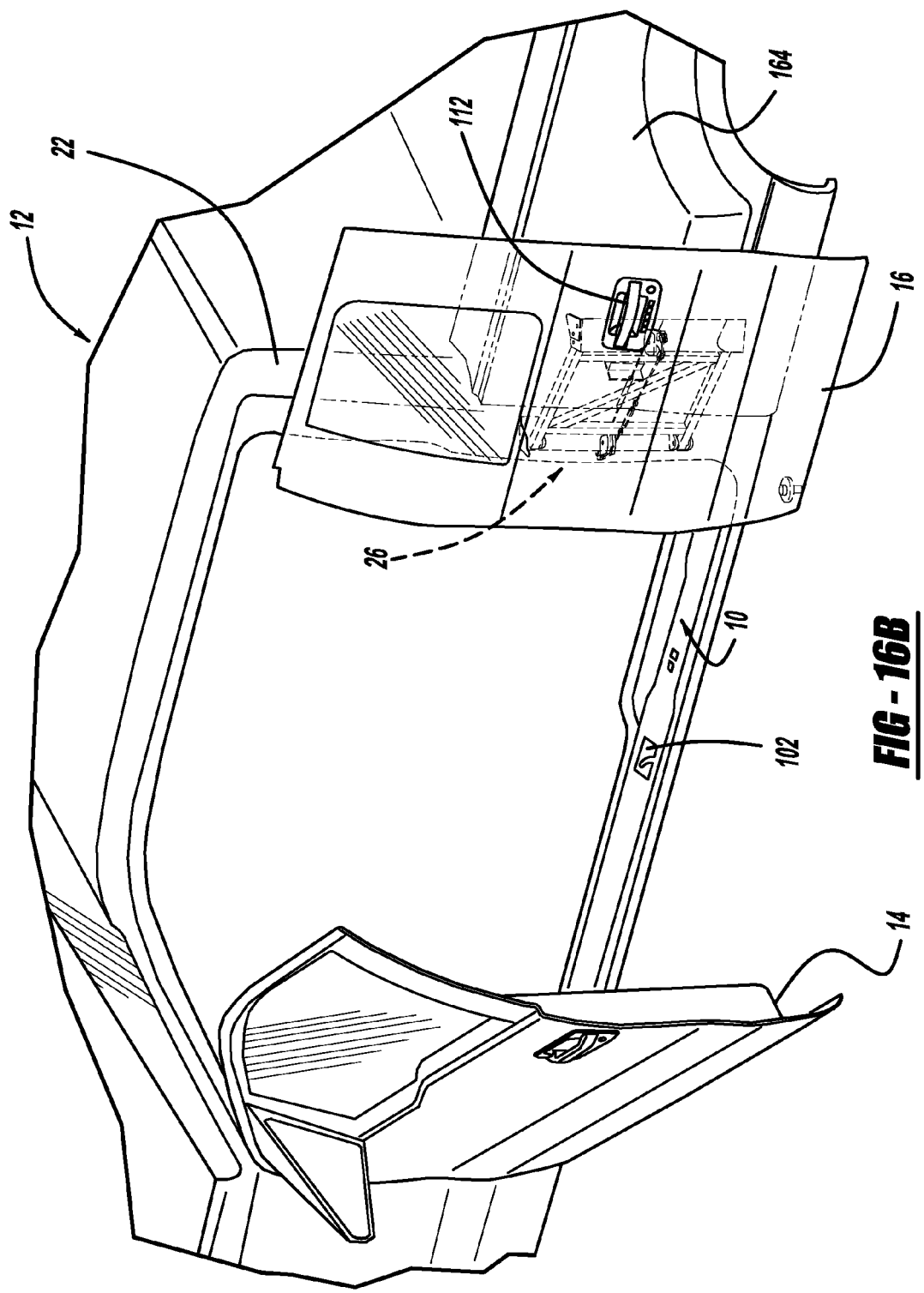
Figure 17A:
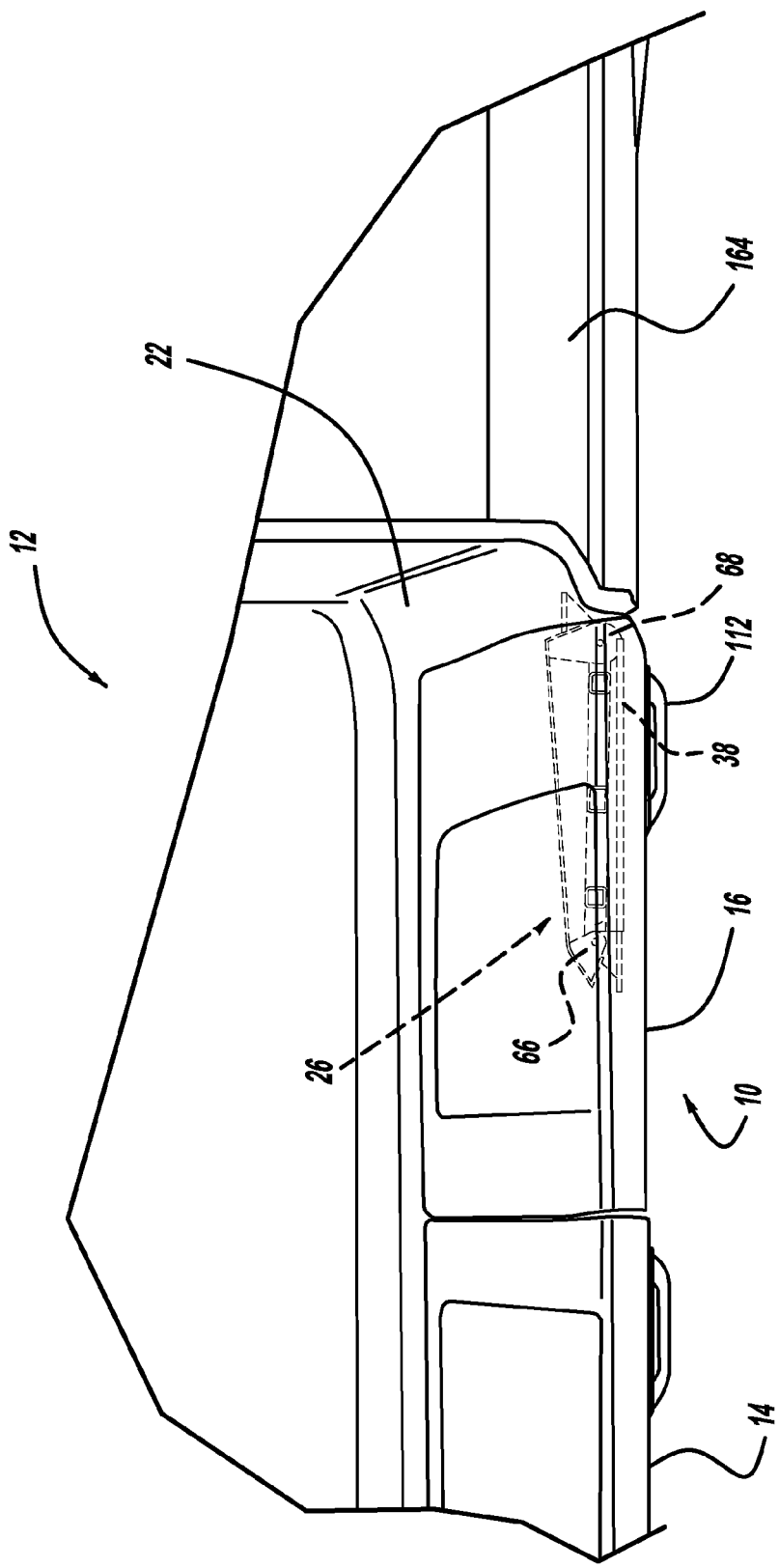
Figure 17B:
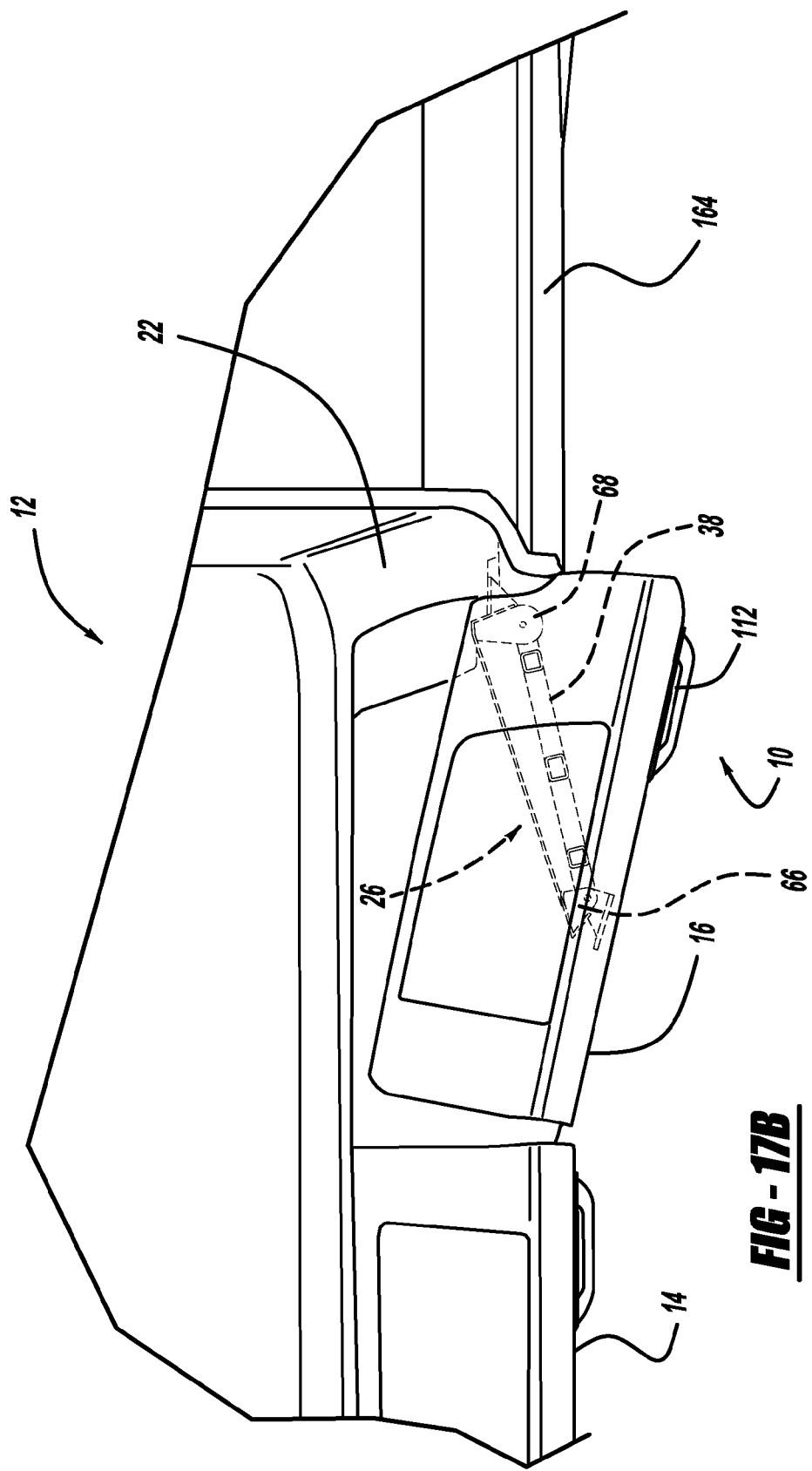
Figure 17E:
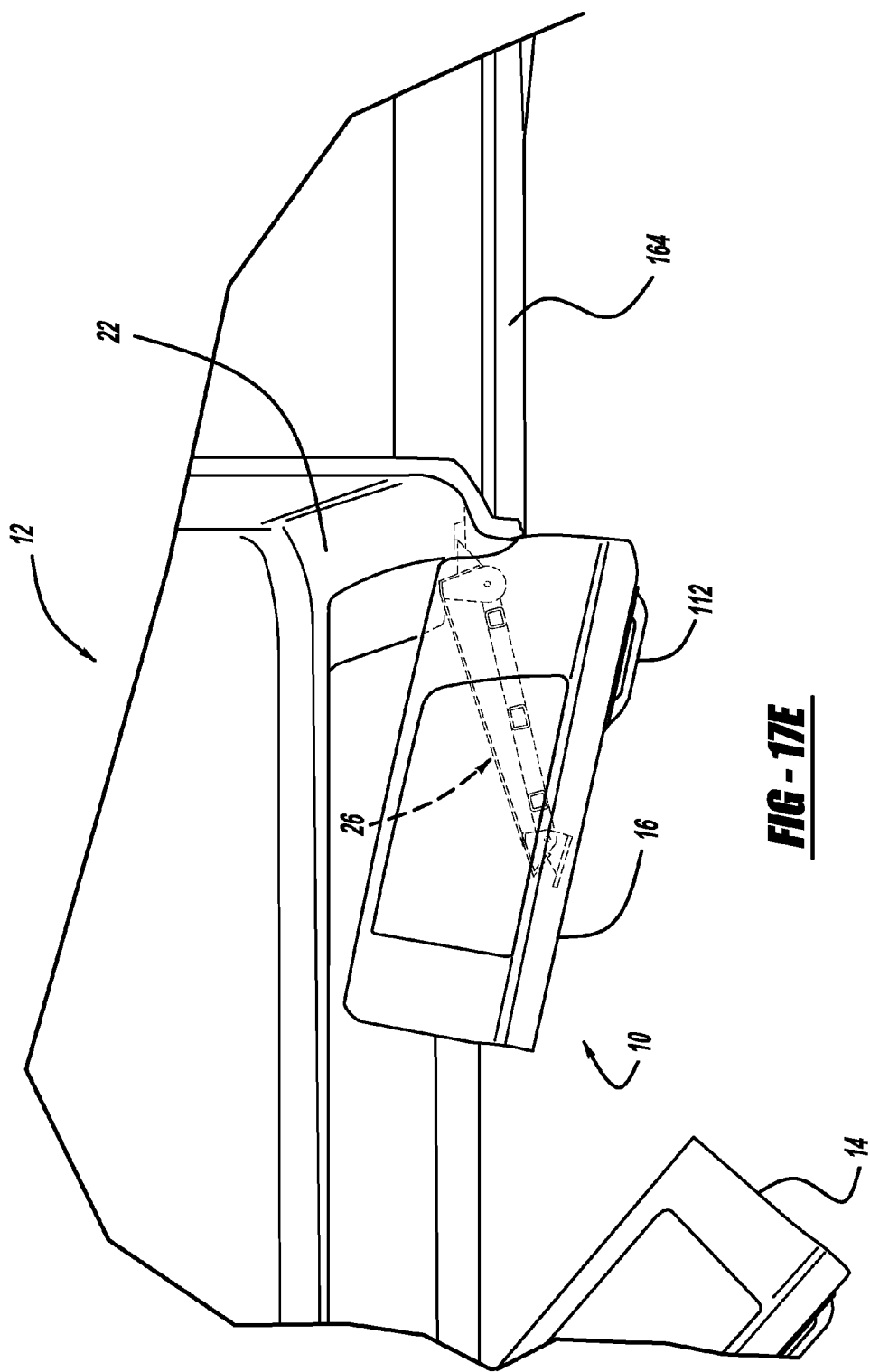
Figure 18A:
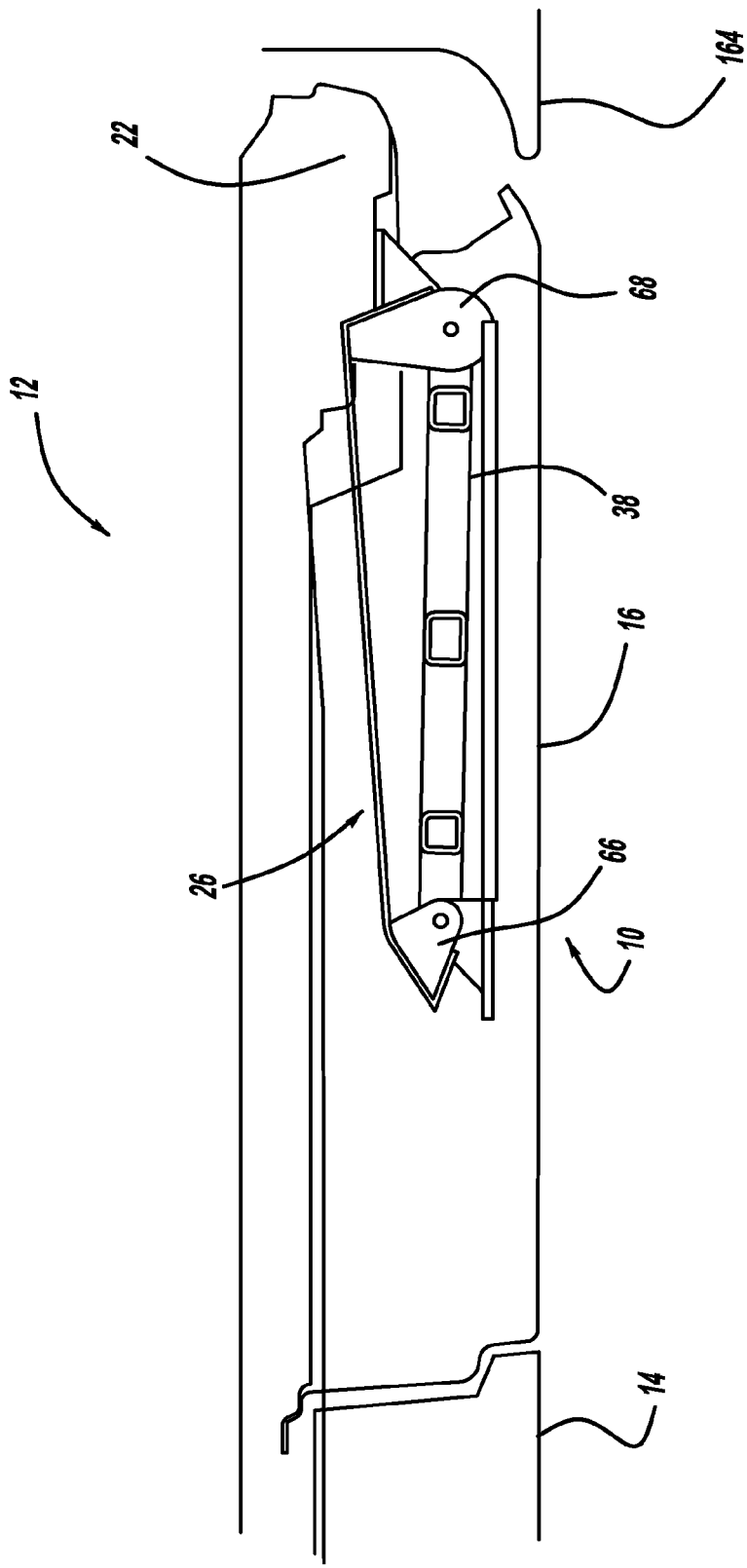
FIGS. 18A through 18D illustrate a first embodiment of articulating mechanism wherein interface between rear door and adjacent front door includes rear door leading edge is tucked behind front door.
Figure 18B:
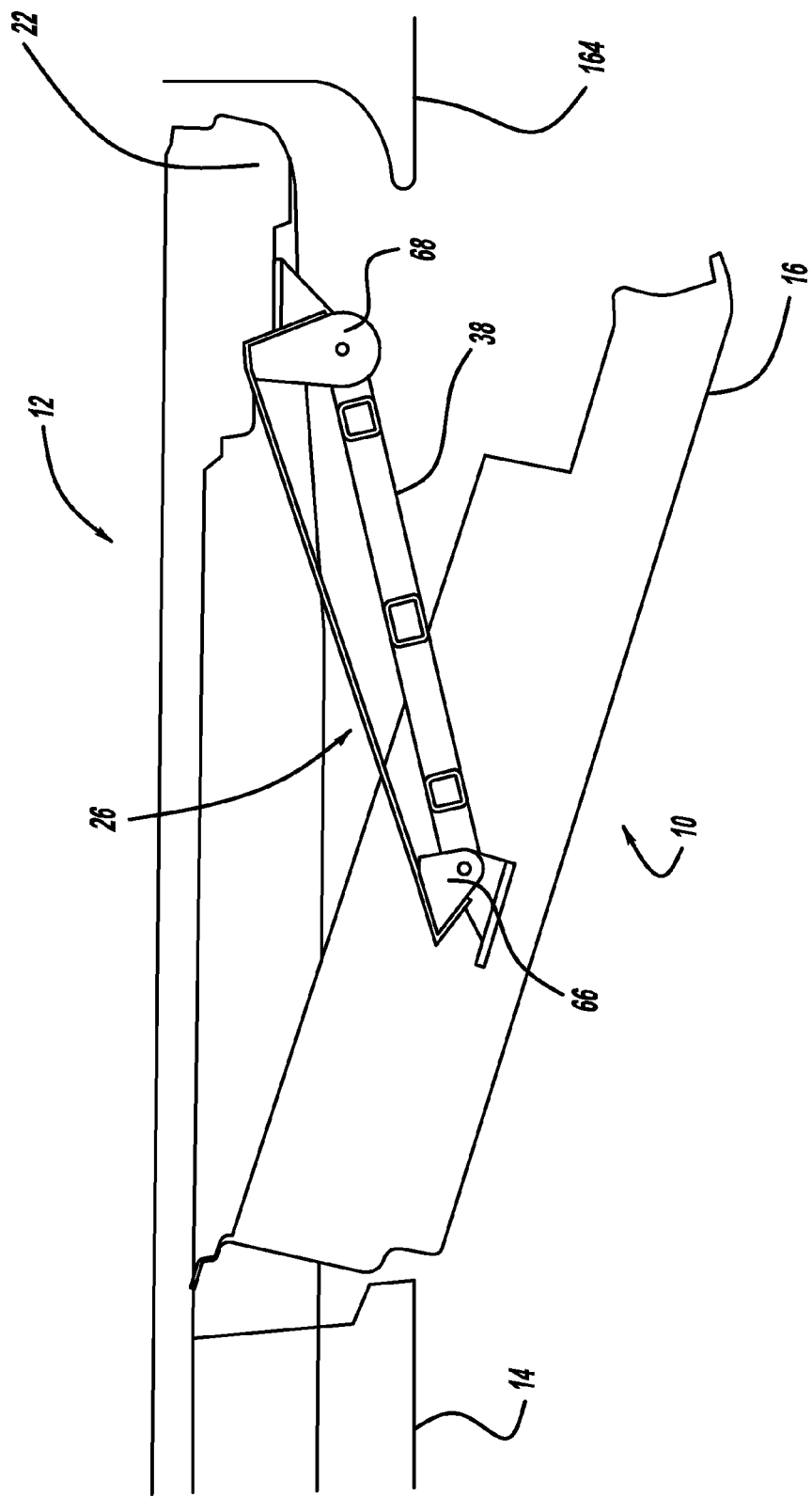
Figure 18C:
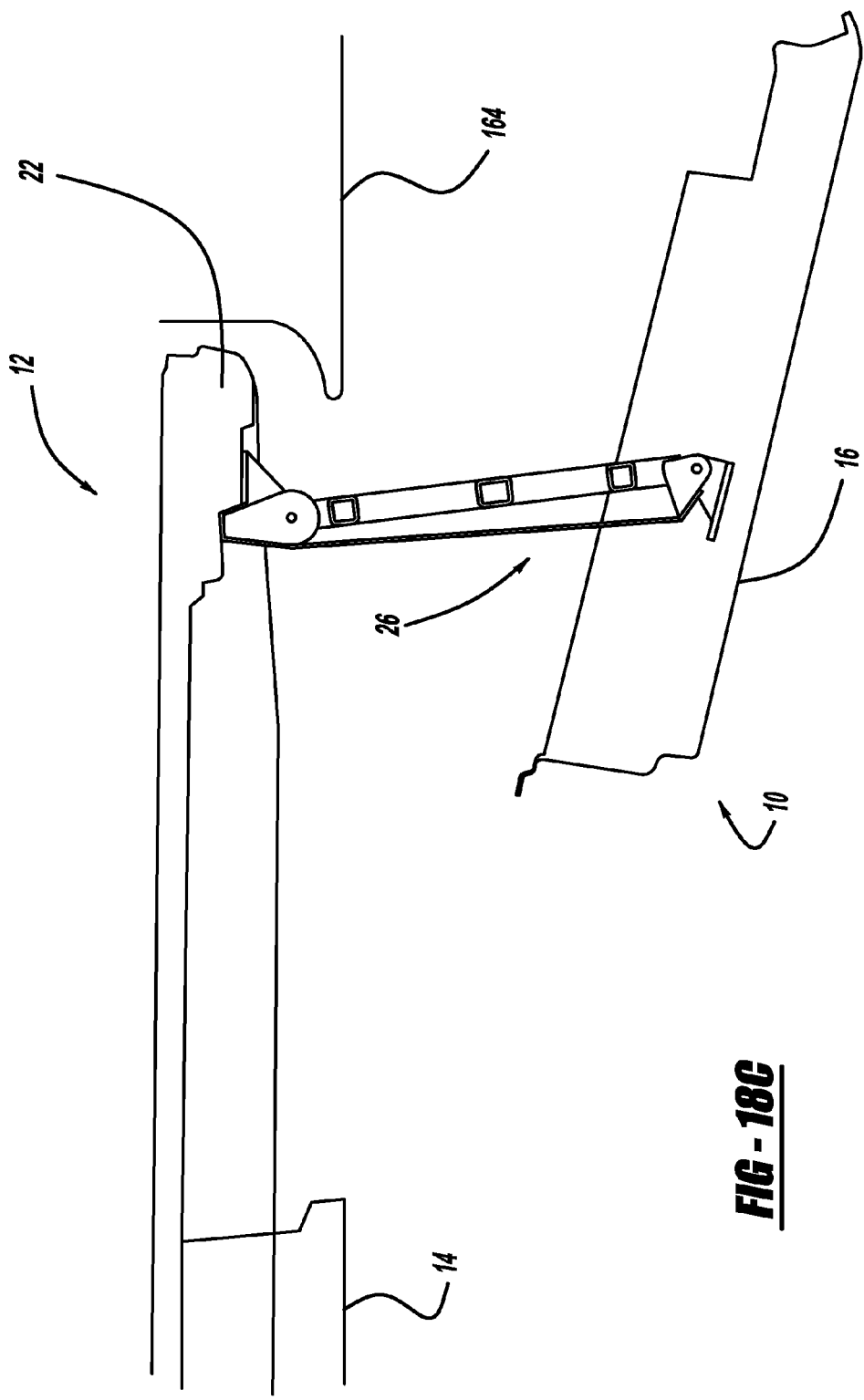
Figure 18D:
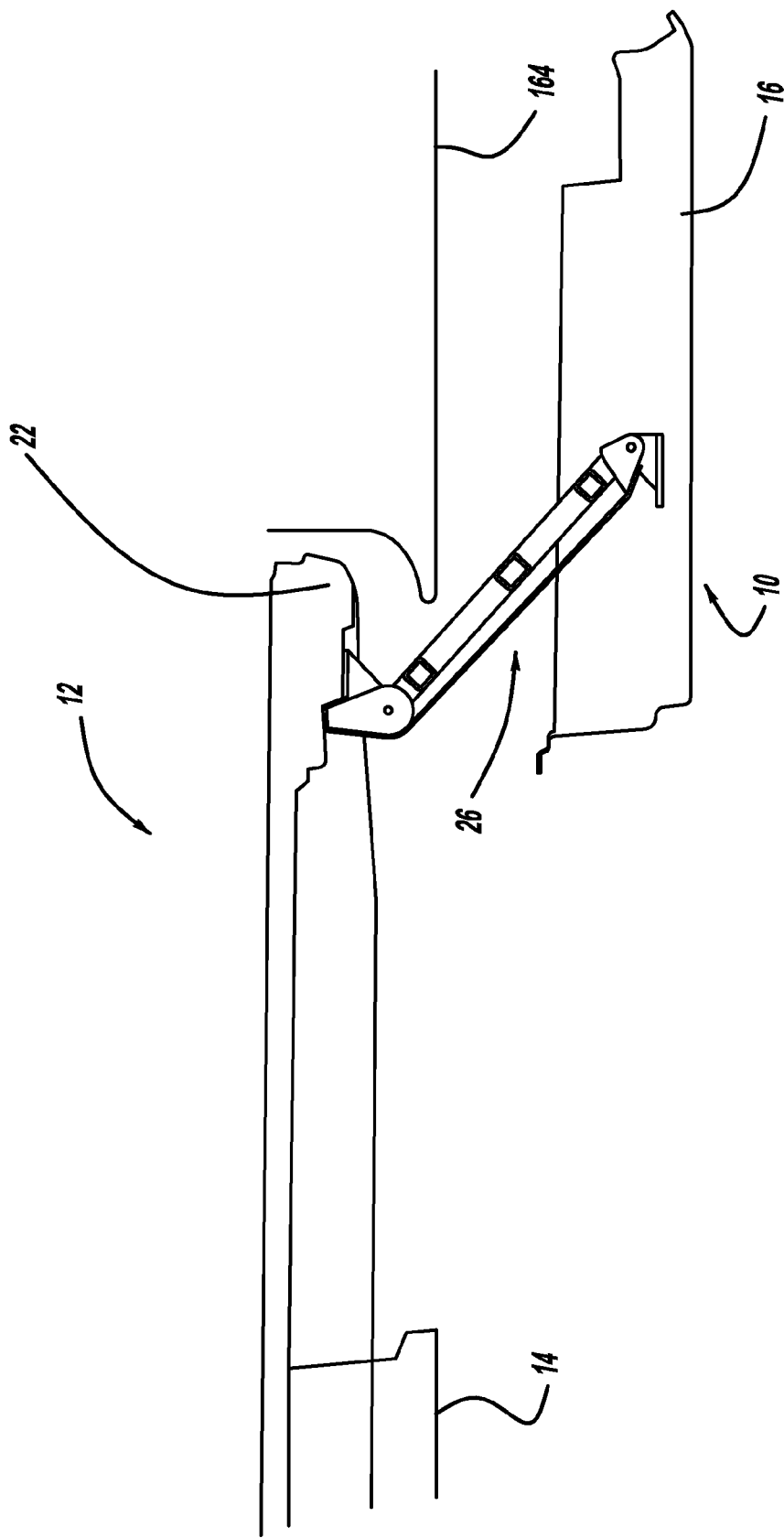

As discussed above, since rear door articulating and sliding mechanism 10 may allow for complete opening of rear door 16, with front door 14 being fully opened or closed, referring to FIGS. 15A, 15B, 16A and 16B, in a similar manner as discussed above with reference to FIGS. 14A-14D, the opening of rear door 16 is illustrated from the just beginning to open position of FIGS. 15A, 16A to the fully opened position of FIGS. 15B, 16B, with front door 14 open.

Referring to FIGS. 17A-18D, one embodiment of articulating mechanism 10 is illustrated in a top view. In rest position illustrated in FIGS. 17A and 18A, belt 38 is wrapped around door side cam 66 and tangent to a point on vehicle side cam 68. As rear door 16 begins to open (FIGS. 17B and 18B) and continues to open (FIGS. 17C-D), belt 38 unwraps around door side cam 66 and begins to wrap around vehicle side cam 68, allowing acceleration of rotation to move rear door 16 away from front door 14. When hinge assembly 26 has reached approximately 90° from rest position, belt 38 continues to wrap around vehicle side cam 68, rotation decelerates, and rear door 16 is brought parallel with vehicle body 164.

To summarize, the invention thus provides rear door articulating mechanism 10 for vehicle rear door articulation, with the system permitting opening and closing of a rear door with or without a front door being opened. The system requires minimal modification of a vehicle structure, in that, components such as hinge mounts 32, 26 can be installed by minimal modification to a C-pillar area or the rear door and roof structure. The invention facilitates ease of ingress and egress and allows maximum access for loading and unloading of transportable items. Based on the discussion above, the mode of opening of rear door 16 is not constrained by parking lot restrictions that limit conventional door opening when adjacent to another vehicle or object that prevents full rotation of a conventional hinged door. Thus, parking lot entrapment, which prevents access to the door openings in such situations, is thereby avoided.

Those skilled in the art would readily appreciate in view of this disclosure that various modifications could be made to the aforementioned components, without departing from the scope of the present invention. For example, first and second cams 66, 68 could be configured in a variety of shapes and sizes to allow rotation ratios of belt 38 as rear door 16 is opened. Belt 38 could include one or more timing mechanisms to aid control of rotation. Yet further, whereas mechanism 10 has been described as being usable with rear door 16 in the exemplary embodiment illustrated, it is readily evident that mechanism 10 may be usable with a vehicle front, middle or other doors, or with a compartment closure (i.e. broadly a vehicle door for the occupant compartment or another compartment for storing objects), or a tailgate assembly, for facilitating the afore-described articulating/sliding operation. Moreover, whereas door 16 has been discussed as being manually operable via handle 112, mechanism 10 may be used with an automatic door 16 operable, for example, by a remote or vehicle mounted push-button.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle door articulating mechanism comprising:
   at least one articulating hinge assembly comprising:
   at least one hinge arm pivotally mounted via a first hinge mount to a vehicle structure at one end thereof;
   a vehicle door pivotally mounted via a second hinge mount to said hinge arm at an opposite end of said hinge arm;
   a first cam mounted to the first hinge mount at one end of said hinge arm;
   a second cam mounted to the second hinge mount at an opposite end of said hinge arm; and
   a belt at least partially encircling both the first and second cams,
   wherein said hinge arm is disposed at first and second angular positions when the vehicle door is respectively disposed in closed and opened positions, whereby said vehicle door articulating mechanism allows said door to articulate away independent of an adjacent vehicle door during initial and continued opening of the vehicle door.

2. The vehicle door articulating mechanism according to claim 1, wherein said belt includes both a spring and a tensioner.

3. The vehicle door articulating mechanism according to claim 1, wherein the door comprises a rear door of the vehicle, wherein the rear door articulates away independent of a front door.

4. The vehicle door articulating mechanism according to claim 1, wherein the door is parallel to a body of the vehicle when in the closed position, and wherein the door rotates outward and moves into an open position that is parallel to the body.

5. The vehicle door articulating mechanism according to claim 4, wherein the door is angled between zero and ninety degrees relative to the body when in an intermediate position.

6. The vehicle door articulating mechanism according to claim 1, wherein the vehicle structure comprises a vehicle C-pillar.

7. A vehicle door articulating mechanism comprising:
   at least one articulating hinge assembly including:
   at least one hinge arm pivotally mounted via a first hinge mount to a vehicle structure at one end thereof;
   a vehicle door pivotally mounted via a second hinge mount to said hinge arm at an opposite end of said hinge arm;
   a first cam mounted to the first hinge mount at one end of said hinge arm;
   a second cam mounted to the second hinge mount at an opposite end of said hinge arm;
   and
   a belt at least partially encircling both the first and second cams,
   wherein said hinge arm is disposed at first and second angular positions when the vehicle door is respectively disposed in closed and opened positions, whereby said vehicle door articulating mechanism provides articulating movement of the vehicle door relative to a vehicle body during opening thereof.

8. The vehicle door articulating mechanism according to claim 7, wherein said mechanism provides articulating movement of the vehicle door, independent of a vehicle adjacent door.

9. The vehicle door articulating mechanism according to claim 7, wherein said belt includes a spring and a tensioner.

10. The vehicle door articulating mechanism according to claim 7, wherein the vehicle door comprises a rear door of the vehicle, wherein the rear door articulates away independent of a front door.

11. The vehicle door articulating mechanism according to claim 7, wherein the door is parallel to the body of the vehicle when in the closed position, and wherein the door rotates outward and moves into an open position that is parallel to the body.

12. The vehicle door articulating mechanism according to claim 11, wherein the door is angled between zero and ninety degrees relative to the body when in an intermediate position.

13. The vehicle door articulating mechanism according to claim 7, wherein the vehicle structure comprises a vehicle C-pillar.

14. A method of opening a vehicle door using an articulating mechanism, said method comprising the steps of:
   providing an articulating mechanism having at least one articulating hinge assembly comprising at least one hinged arm pivotally mounted to a vehicle structure and a vehicle door and including first and second cams and a belt at least partially encircling both the first and second cams;
   actuating a door latch to unlatch the door;
   pivoting the vehicle door relative to the vehicle structure such that the belt at least partially unwraps from the first cam and wraps around the second cam, thereby causing acceleration of rotation to move the door further into an open position; and
   continuing to pivot the door into a further open position such that the belt continues to wrap around the rear cam to thereby decelerate the rotation of the door and bring the door substantially parallel to a vehicle body.

* * * * *